(12) United States Patent
Maki et al.

(10) Patent No.: US 11,509,242 B2
(45) Date of Patent: Nov. 22, 2022

(54) POWER CONVERSION APPARATUS

(71) Applicant: Toshiba Infrastructure Systems & Solutions Corporation, Kawasaki (JP)

(72) Inventors: Koji Maki, Kawasaki (JP); Hiroshi Mochikawa, Hachioji (JP)

(73) Assignee: Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/333,608

(22) Filed: May 28, 2021

(65) Prior Publication Data

US 2021/0408943 A1 Dec. 30, 2021

(30) Foreign Application Priority Data

Jun. 25, 2020 (JP) .............................. JP2020-109954

(51) Int. Cl.
*H02M 7/5387* (2007.01)
*H02M 3/335* (2006.01)

(52) U.S. Cl.
CPC ...... *H02M 7/53871* (2013.01); *H02M 3/33576* (2013.01)

(58) Field of Classification Search
CPC ...... H02M 7/483; H02M 1/348; H02M 3/335; H02M 1/0006; H02M 3/33573; H02M 3/33507; H02M 3/33576; H02M 3/155; H02M 1/088; H02M 7/487; H02M 7/5387; H02M 7/53871; H02M 5/293
See application file for complete search history.

(56) References Cited

U.S. PATENT DOCUMENTS

| | | | |
|---|---|---|---|
| 5,424,937 A | 6/1995 | Iyotani et al. | |
| 5,579,215 A | 11/1996 | Turuta | |
| 6,297,795 B1 | 10/2001 | Kato et al. | |
| 2007/0025126 A1 | 2/2007 | Barbosa et al. | |
| 2020/0177097 A1* | 6/2020 | Takahashi | H02M 7/003 |

(Continued)

FOREIGN PATENT DOCUMENTS

| | | |
|---|---|---|
| EP | 0 573 836 A2 | 12/1993 |
| JP | 07-213076 A | 8/1995 |
| JP | 2957407 B2 | 10/1999 |

(Continued)

OTHER PUBLICATIONS

Hagiwara et al., "PWM Control and Experiment of Modular Multilevel Converters", The Institute of Electrical Engineers of Japan, vol. 128, No. 7, 2008, 30 pages (with English Machine Translation).

(Continued)

*Primary Examiner* — Adolf D Berhane
(74) *Attorney, Agent, or Firm* — Maier & Maier, PLLC

(57) ABSTRACT

An apparatus according to an embodiment includes an upper and lower arm connected between a high and a low potential end; a first capacitor connected at one end to the high potential end; a second capacitor connected at one end to the low potential end; a first regenerative rectifier circuit connected to another end of the first capacitor; a second regenerative rectifier circuit connected to another end of the second capacitor; a first conversion circuit to cause energy stored in the first capacitor to be discharged; and a second conversion circuit to cause energy stored in the second capacitor to be discharged.

8 Claims, 15 Drawing Sheets

(56) References Cited

U.S. PATENT DOCUMENTS

2021/0091573 A1* 3/2021 Takamatsu ........ H02M 7/53871
2021/0091660 A1* 3/2021 Takahashi ............... H02M 1/32

FOREIGN PATENT DOCUMENTS

| JP | 2957507 B2 | 10/1999 |
| JP | 2007-508792 A | 4/2007 |
| JP | 2008-092651 A | 4/2008 |
| JP | 2020-108326 A | 7/2020 |
| JP | 2021-016242 A | 2/2021 |
| JP | 2021-87263 A | 6/2021 |

OTHER PUBLICATIONS

Zarghani et al., "A Series Stacked IGBT Switch Based on a Concentrated Clamp Mode Snubber for Pulsed Power Applications", IEEE Transactions on Power Electronics, vol. 34, No. 10, Oct. 2019, pp. 9573-9584.

Extended European Search Report dated Oct. 21, 2021 in European Patent Application No. 21175635.8, citing documents AA, AB, and AO therein, 8 pages.

* cited by examiner

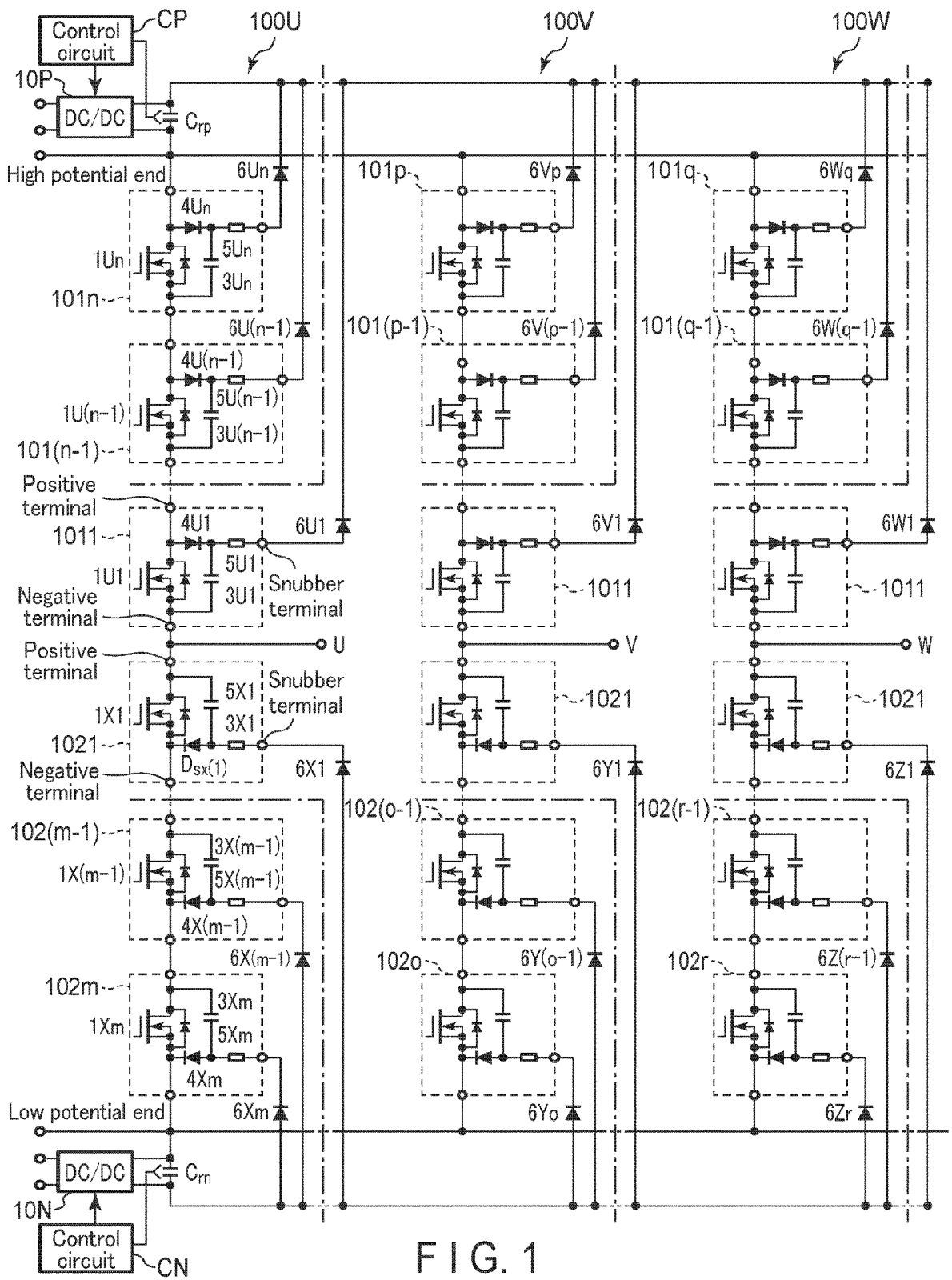
F I G. 1

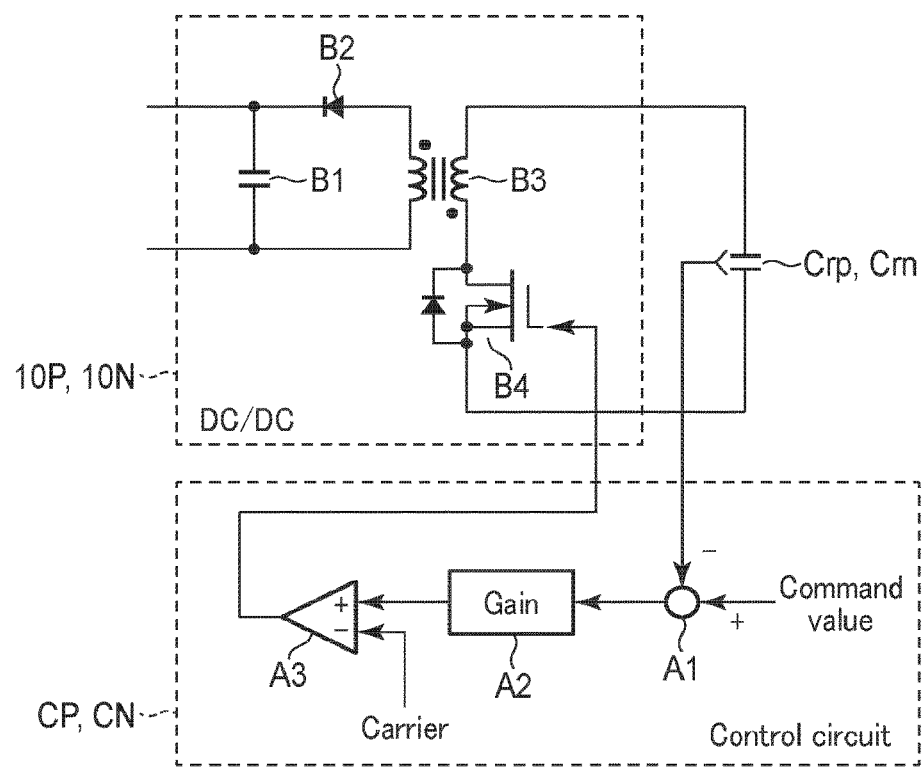
F I G. 2
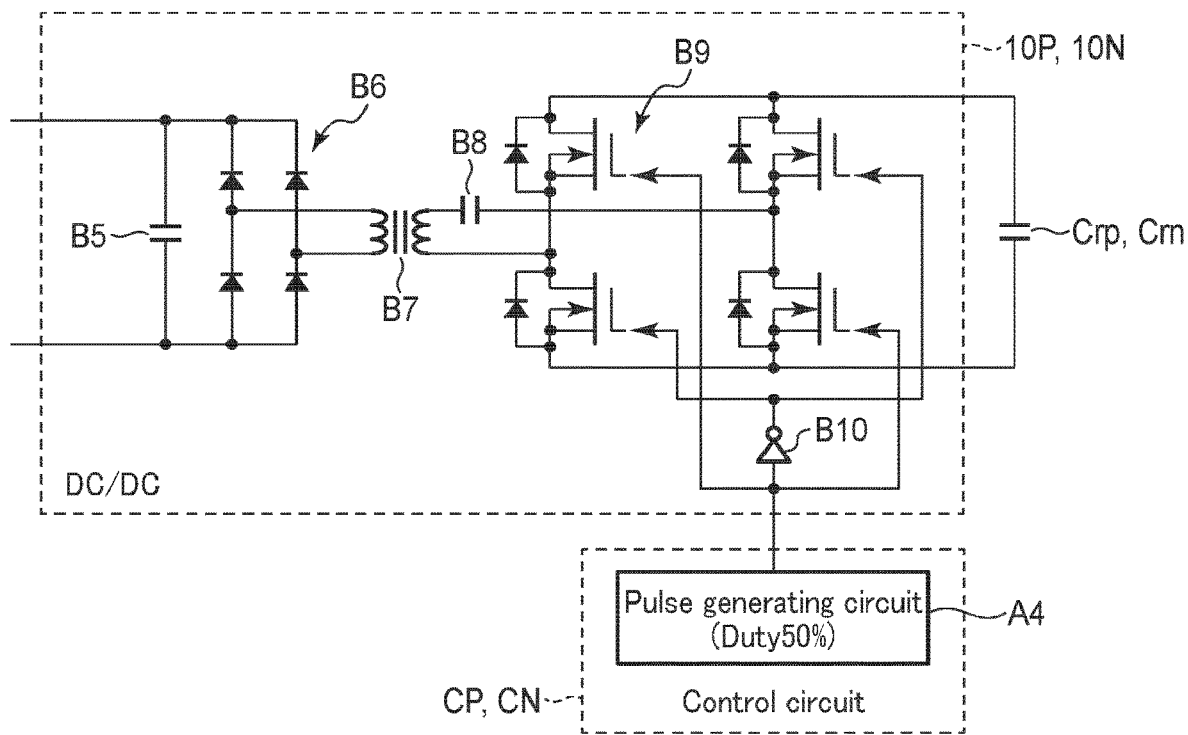
F I G. 3

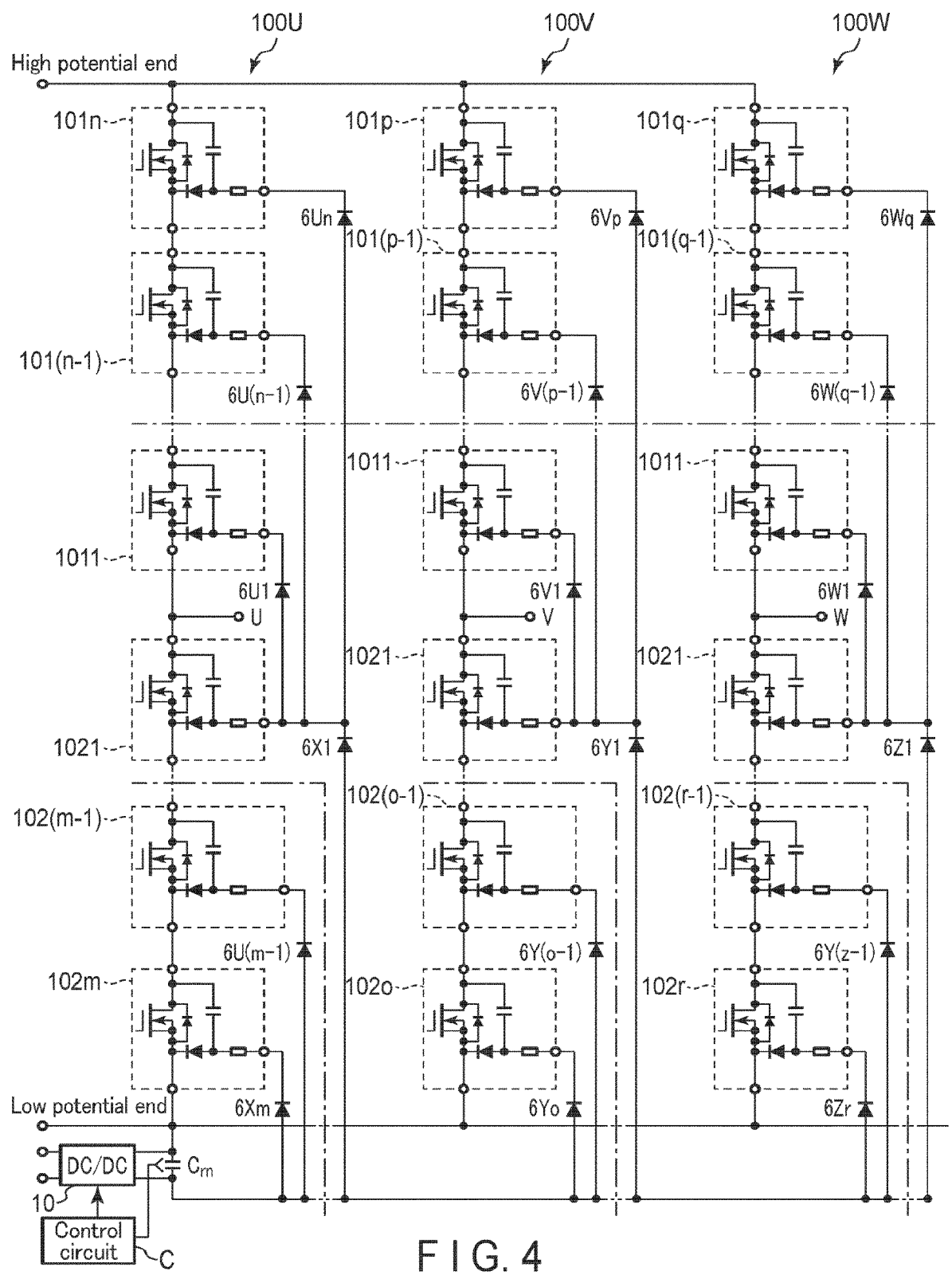
F I G. 4

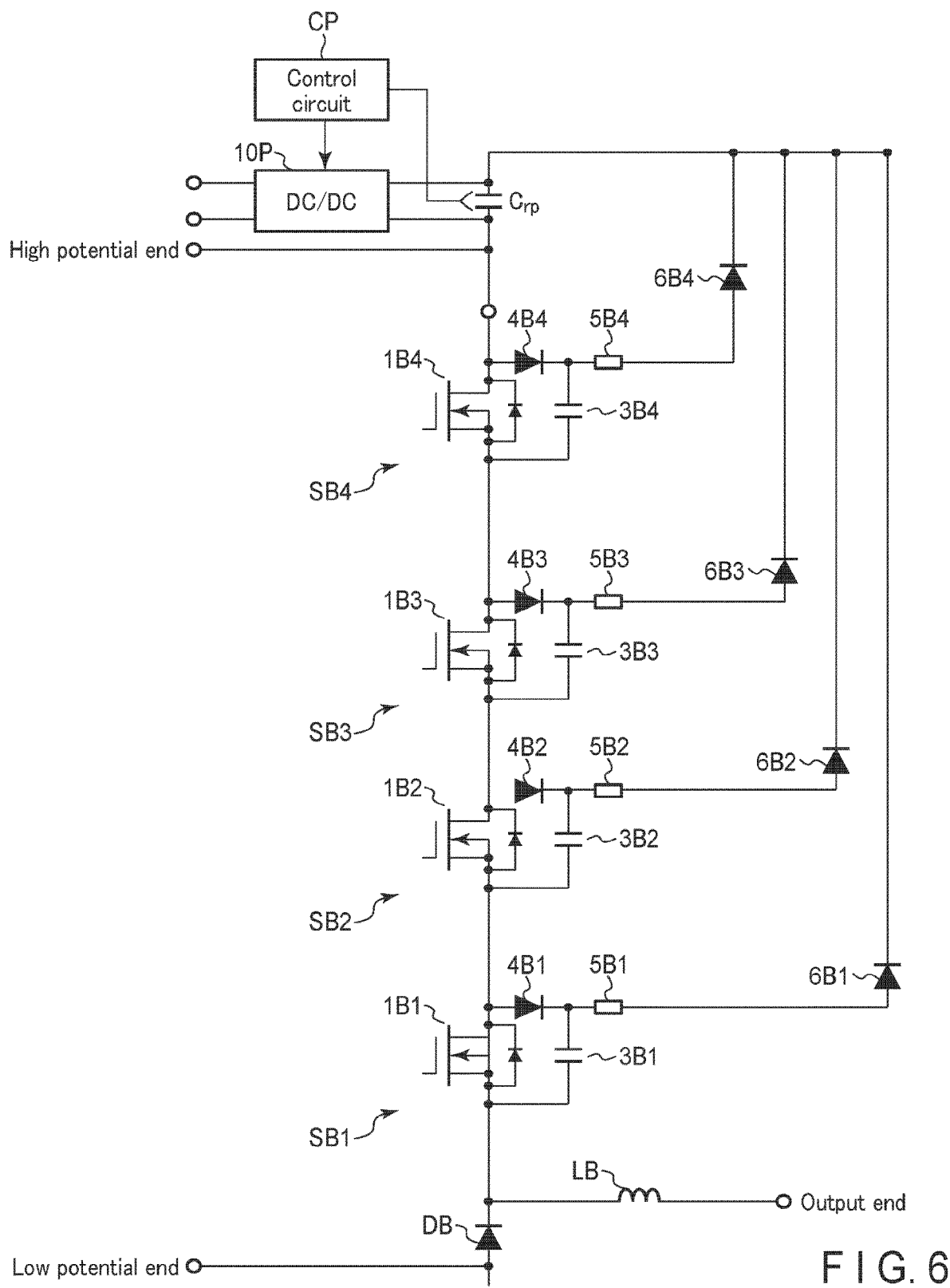
F I G. 6

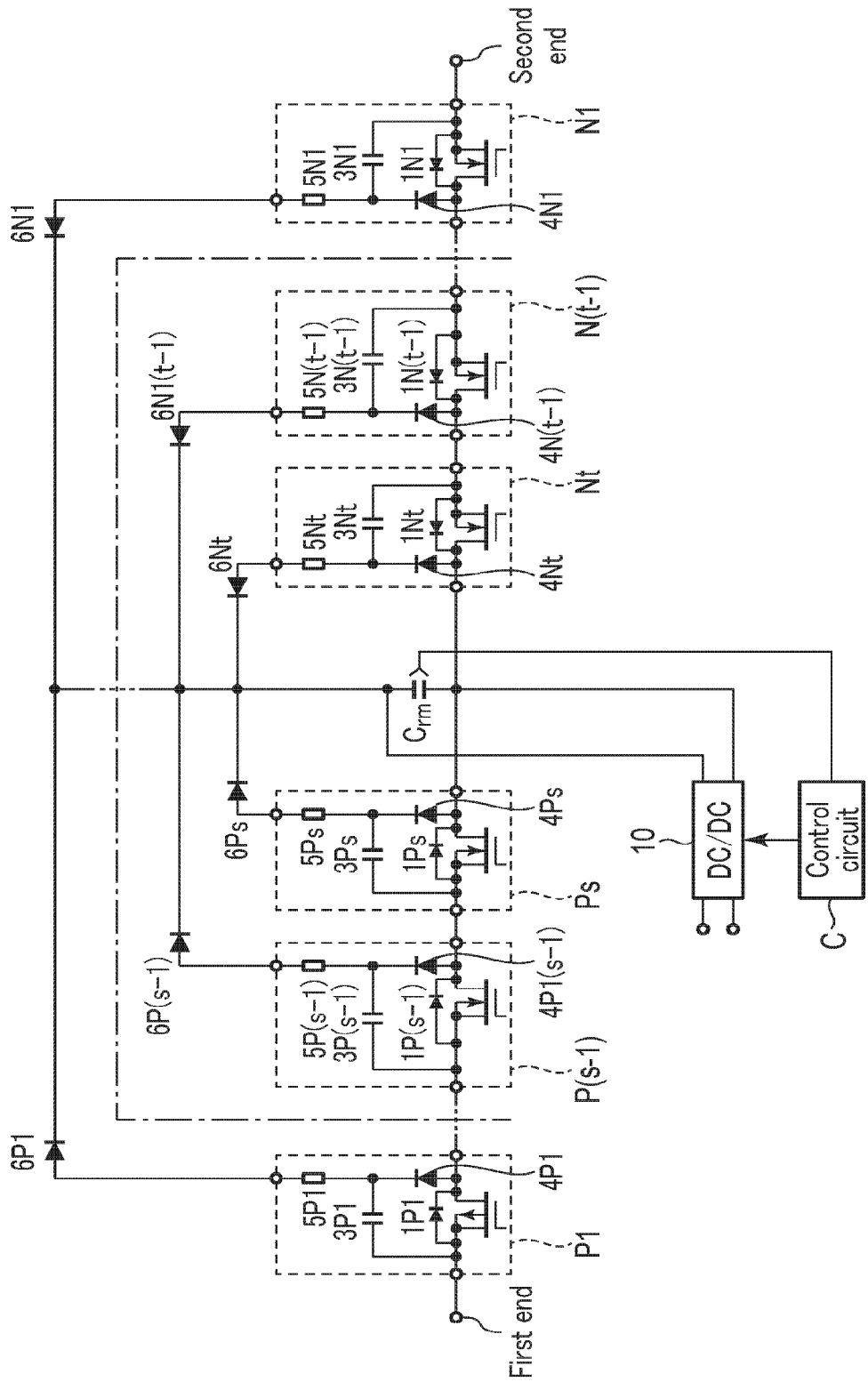
F I G. 13

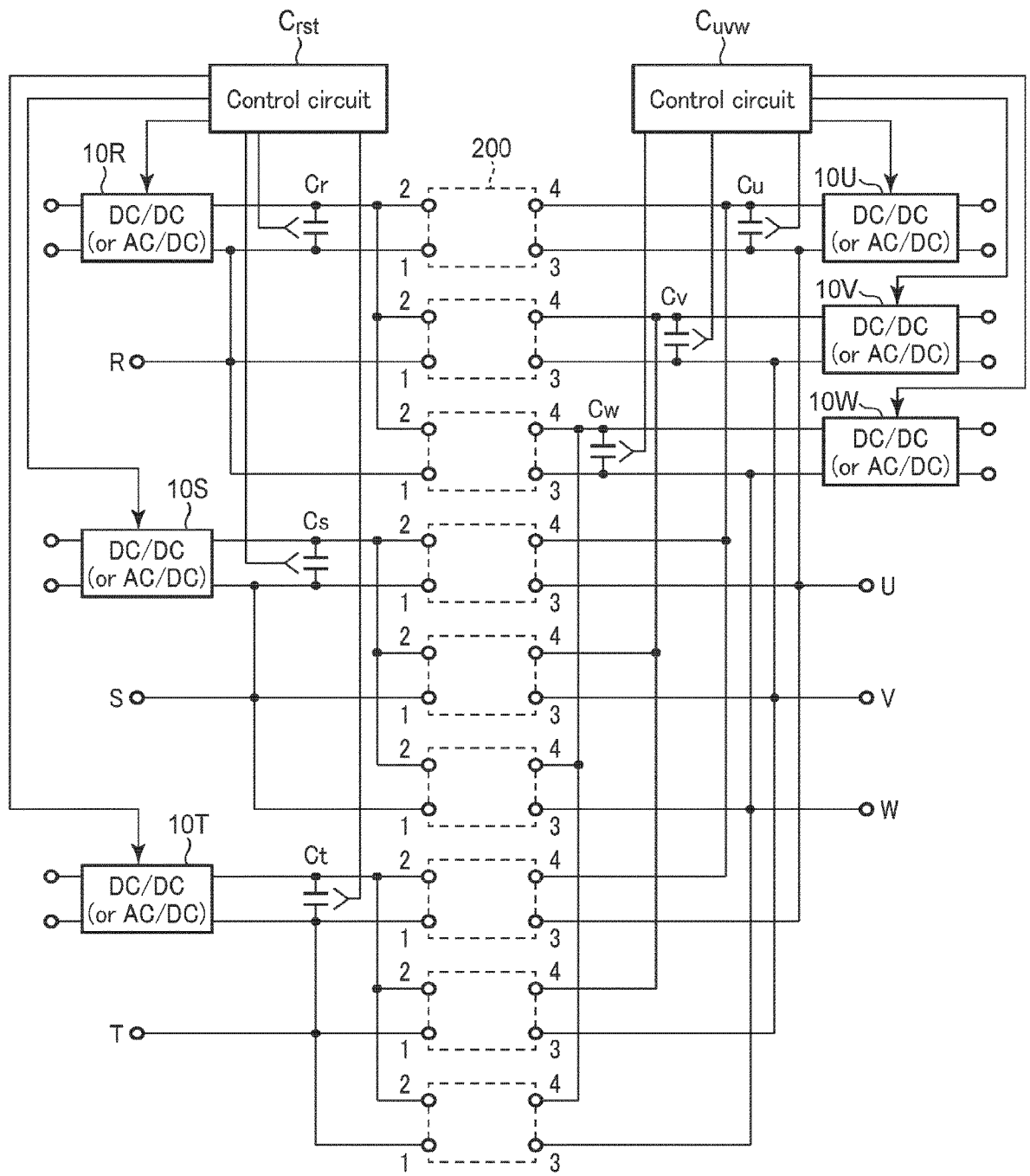
F I G. 15

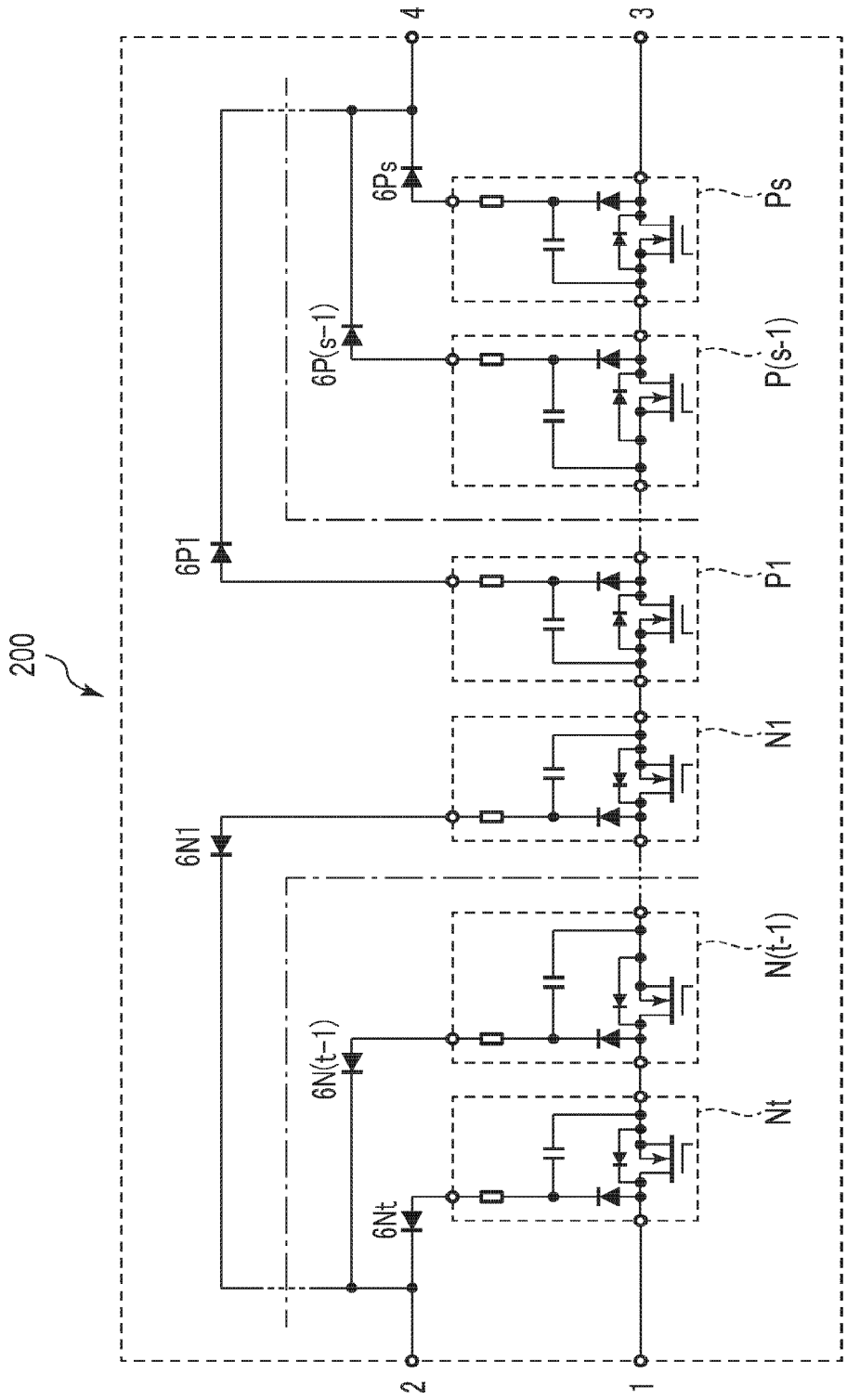
F I G. 16

POWER CONVERSION APPARATUS

CROSS-REFERENCE TO RELATED APPLICATIONS

This application is based upon and claims the benefit of priority from Japanese Patent Application No. 2020-109954, filed Jun. 25, 2020; the entire contents of which are incorporated herein by reference.

FIELD

Embodiments described herein relate generally to a power conversion apparatus.

BACKGROUND

A power conversion apparatus including a snubber circuit configured to suppress a parasitic inductance in a switching loop and a surge voltage that occurs due to switching can improve energy efficiency by regenerating energy of a surge voltage absorbed by the snubber circuit to a DC power supply.

In recent years, a multilevel power conversion apparatus capable of outputting voltages at multiple levels has been proposed. A multilevel power conversion apparatus can suppress the switching loss without increasing the switching speed, by increasing the number of levels of output voltages.

However, the power conversion apparatus including the above-described snubber circuit causes the snubber circuit to absorb energy of the surge voltage generated by increasing the switching speed, and it is difficult to suppress the loss caused by switching when the switching speed is low.

A diode clamp type multilevel conversion apparatus and a flying capacitor type multilevel conversion apparatus can reduce the switching loss without increasing the switching speed by lowering the voltage applied to each switching element. However, in diode clamp type and flying capacitor type multilevel conversion apparatuses, the parasitic inductance in the switching loop may become larger and a larger surge voltage may be generated than in a conventional two-level power conversion apparatus. In this case, the switching speed needs to be further lowered to suppress the surge voltage, and it is not possible to take full advantage of the effect of reducing the switching loss.

A modular type multilevel conversion apparatus has a configuration in which a switching loop is closed in one module constituted by a DC capacitor connected in parallel to a series of two switching devices. This configuration does not increase the parasitic inductance, and does not require the switching speed to be decreased to suppress the surge voltage. However, the current of the primary component (fundamental wave component) or the secondary component of the AC frequency flows into the DC capacitor, and the DC capacitor needs to be increased in size; accordingly, it has been difficult to reduce the size of the power conversion apparatus.

BRIEF DESCRIPTION OF THE DRAWINGS

FIG. 1 is a schematic diagram showing a configuration example of a power conversion apparatus of a first embodiment.

FIG. 2 is a diagram for illustrating a configuration example of the DC/DC converter and control circuit of the power conversion apparatus of the first embodiment.

FIG. 3 is a diagram for illustrating another configuration example of the DC/DC converter and control circuit of the power conversion apparatus of the first embodiment.

FIG. 4 is a schematic diagram showing a configuration example of a power conversion apparatus of a second embodiment.

FIG. 6 is a schematic diagram showing a configuration example of a power conversion apparatus of a fourth embodiment.

FIG. 13 is a schematic diagram showing a configuration example of a switch apparatus of an eighth embodiment.

FIG. 15 is a schematic diagram showing a configuration example of a power conversion apparatus of a tenth embodiment.

FIG. 16 is a schematic diagram showing a configuration example of the power conversion apparatus of the tenth embodiment.

DETAILED DESCRIPTION

Figure 5:
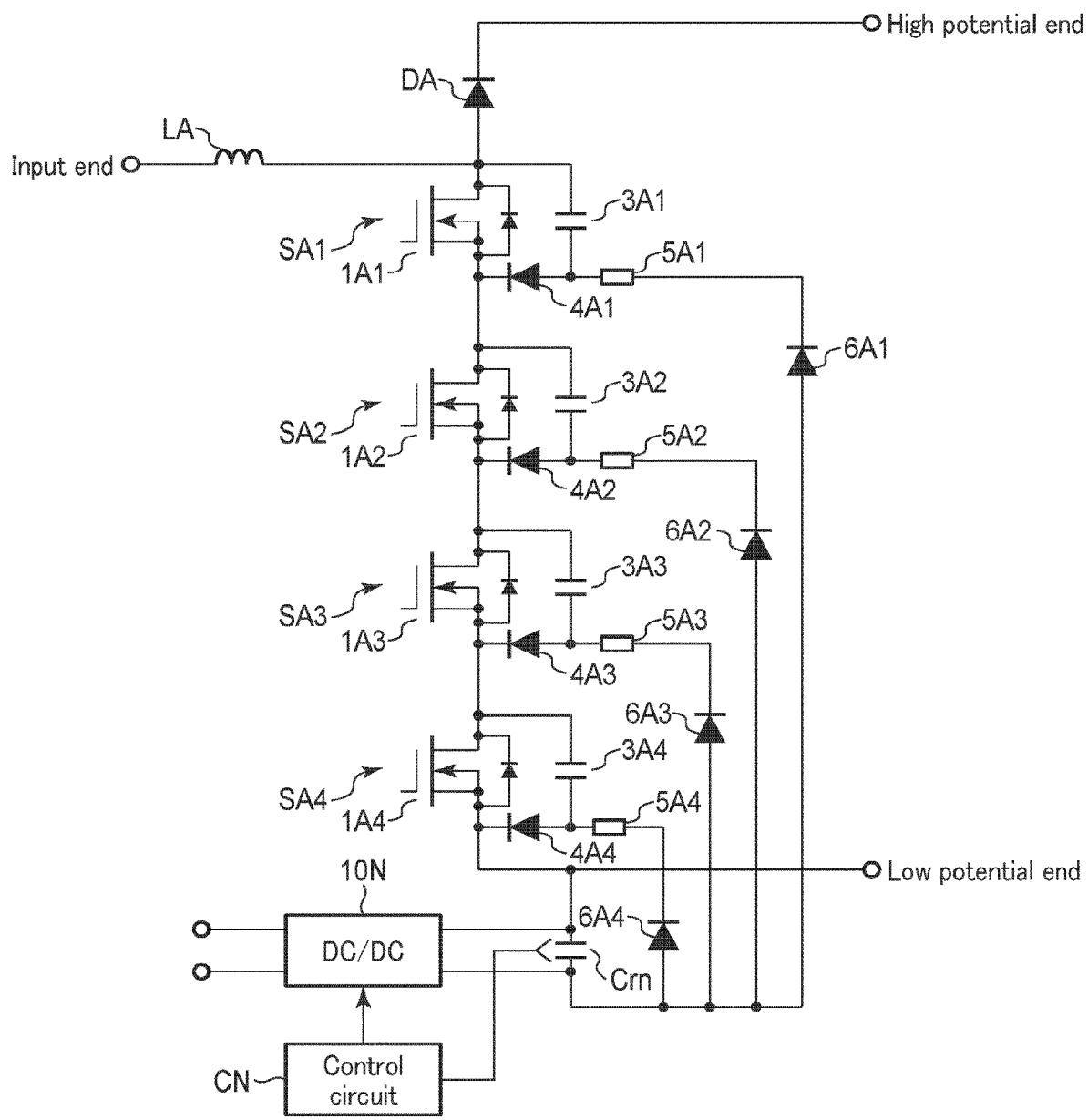
FIG. 5 is a schematic diagram showing a configuration example of a power conversion apparatus of a third embodiment.

A power conversion apparatus according to an embodiment comprises an upper arm and lower arm connected between a high potential end and a low potential end; a first capacitor unit electrically connected at one end to the high potential end; a second capacitor unit electrically connected at one end to the low potential end; a first regenerative rectifier circuit connected to another end of the first capacitor unit; a second regenerative rectifier circuit connected to another end of the second capacitor unit; a first conversion circuit configured to cause energy stored in the first capacitor unit to be discharged; and a second conversion circuit configured to cause energy stored in the second capacitor unit to be discharged.

The upper arm comprises a first switch circuit or a series of first switch circuits. The first switch circuit comprises a first switching element, a first diode with an anode connected to a high potential end of the first switching element, and a first capacitor connected between a cathode of the first diode and a low potential end of the first switching element.

The lower arm comprises a second switch circuit or a series of second switch circuits. The second switch circuit comprises a second switching element, a second diode with a cathode connected to a low potential end of the second switching element, and a second capacitor connected between an anode of the second diode and a high potential end of the second switching element.

The first regenerative rectifier circuit connects a high potential end of the first capacitor of the upper arm to the other end of the first capacitor unit with a forward direction directed from a low potential side to a high potential side.

The second regenerative rectifier circuit connects a low potential end of the second capacitor of the lower arm to the other end of the second capacitor unit, with a forward direction directed from the low potential side to the high potential side.

Hereinafter, power conversion apparatuses and switch apparatuses according to embodiments will be described in detail with reference to the accompanying drawings.

Embodiments described below provide power conversion apparatuses and switch apparatuses capable of suppressing the energy loss and avoiding an increase in size.

FIG. 1 is a schematic diagram showing a configuration example of a power conversion apparatus of a first embodiment.

The power conversion apparatus of the present embodiment is, for example, a power conversion apparatus capable of mutual conversion between DC power and three-phase AC power. This power conversion apparatus includes three-phase legs 100U, 100V, 100W, a high potential end, a low potential end, AC terminals U, V, W, capacitor units Crp, Crn, DC/DC converters 10P, 10N, and control circuits CP, CN. A DC capacitor (not shown) may be electrically connected between the high potential end and low potential end of the power conversion apparatus of the present embodiment. The DC capacitor may be included in the power conversion apparatus, or may be externally attached to the power conversion apparatus.

The U-phase leg 100U includes an upper arm, a lower arm, n (n is an integer larger than or equal to 2) first regenerative rectifier circuits (regenerative rectifier diodes 6UN and first resistors 5UN), and m (m is an integer larger than or equal to 2) second regenerative rectifier circuits (regenerative rectifier diodes 6XM and second resistors 5XM).

The V-phase leg 100V includes an upper arm, a lower arm, p (p is an integer larger than or equal to 2) third regenerative rectifier circuits (regenerative rectifier diodes 6VP and first resistors 5VP), and o (o is an integer larger than or equal to 2) fourth regenerative rectifier circuits (regenerative rectifier diodes 6YO and second resistors 5YO).

The W-phase leg 100W includes an upper arm, a lower arm, q (q is an integer larger than or equal to 2) fifth regenerative rectifier circuits (regenerative rectifier diodes 6WQ and first resistors 5WQ), and r (r is an integer larger than or equal to 2) sixth regenerative rectifier circuits (regenerative rectifier diodes 6ZR and second resistors 5ZR).

Here, N is 2 to n, and M is 2 to m. P is 2 to p, and O is 2 to 0. Q is 2 to q, and R is 2 to r. The same applies to the following descriptions unless another definition is provided.

As each capacitor unit Crp, Crn, for example, a capacitor or a battery can be used. The case where a capacitor is used as the capacitor unit Crp, Crn is described in the present embodiment.

The capacitor unit Crp on the high potential side has one end electrically connected to the high potential end and another end connected to the first regenerative rectifier circuits, the third regenerative rectifier circuits, and the fifth regenerative rectifier circuits. The capacitor unit Crn on the low potential side has one end electrically connected to the low potential end and another end connected to the second regenerative rectifier circuits, the fourth regenerative rectifier circuits, and the sixth regenerative rectifier circuits.

Each DC/DC converter 10P, 10N converts energy stored in corresponding one of the capacitor units Crp, Crn into a predetermined voltage to discharge the capacitor unit Crp, Crn. The DC/DC converter 10P, 10N may be connected to, for example, a control power supply, a DC power supply of the power conversion apparatus, or another circuit, which is not shown.

Instead of the DC/DC converters 10P, 10N, the power conversion apparatus may include DC/AC converters which convert energy stored in the capacitor units Crp, Crn into AC power and discharge the capacitor units Crp, Crn.

Each control circuit CP, CN can, for example, control the operation of the DC/DC converter 10P, 10N. The control circuit CP, CN may perform control so that, for example, the voltage of the capacitor unit Crp, Crn takes a predetermined value.

The configurations of the DC/DC converter 10P, 10N and control circuit CP, CN will be described in detail later.

The configurations of the U-phase leg 100U, the V-phase leg 100V, and the W-phase leg 100W are the same; therefore, the configuration of the U-phase leg 100U will be described, and descriptions of the configurations of the V-phase leg 100V and the W-phase leg 100W will be omitted.

The upper arm of the U-phase leg 100U includes n switch circuits (voltage clamp switch circuits) 101N. The lower arm of the U-phase leg 100U includes m switch circuits (voltage clamp switch circuits) 102M.

Each of the n switch circuits (first switch circuits) 101N of the U-phase leg 100U includes a switching element (first switching element) 1UN, a diode (first diode) 4UN, a capacitor (first capacitor) 3UN, a snubber terminal, a positive terminal, and a negative terminal.

Regarding the positive terminal, negative terminal, and snubber terminal, the terminals may be omitted as long as circuits are electrically connectable at the position of each terminal. The switch circuit 101N may include a plurality of switching elements 1UN. In this case, the switching elements 1UN are connected between the positive terminal and the negative terminal in parallel with the capacitor 3UN and the diode 4UN. The switching elements 1UN may be connected in series or parallel to each other.

Each switching element 1UN is, for example, a metal-oxide semiconductor field-effect transistor (MOSFET). The drain (high potential end) of the switching element 1UN is electrically connected to the positive terminal, and the source (low potential end) thereof is electrically connected to the negative terminal.

The diode 4UN has an anode electrically connected to the positive terminal and the drain of the switching element 1UN, and a cathode electrically connected to the snubber terminal. The diode 4UN preferably has fast recovery characteristics with a low recovery loss, and is preferably an element using a schottky barrier diode (SBD) having good recovery characteristics or a wide bandgap semiconductor (such as SiC or GaN).

The capacitor 3UN has one end (low potential end) electrically connected to the negative terminal and the source of the switching element 1UN, and another end (high potential end) electrically connected to the snubber terminal and the cathode of the diode 4UN.

The n switch circuits 101N are connected in series. Namely, the positive terminal of each switch circuit 101N is electrically connected to the negative terminal of the adjacent switch circuit 101N on the high potential side. The positive terminal of the switch circuit 101N closest to the high potential end is electrically connected to the high potential end. In contrast, the negative terminal of each switch circuit 101N is electrically connected to the positive terminal of the adjacent switch circuit 101N on the low potential side. The negative terminal of the switch circuit 101N (N=1) closest to the low potential end is electrically connected to the AC terminal U and the lower arm.

Then regenerative rectifier diodes (first regenerative rectifier diodes) 6UN (N=1 to n) are each connected between the snubber, terminal of the first switch circuit 101N and the other end of the capacitor unit Crp on the high potential side, with their forward directions directed from the low potential side to the high potential side. In other words, the snubber terminal of the first switch circuit 101N is electrically connected to the anode of the regenerative rectifier diode 6UN. The other end of the capacitor unit Crp is electrically connected to the cathodes of the regenerative rectifier diodes 6U1 to 6Un.

The resistor 5UN is connected, at one end, to a node between the diode 4UN and the capacitor 3UN (part of a structure electrically connecting the other end (high potential end) of the capacitor 3UN to the cathode of the diode 4UN) in series. The other end of the resistor 5UN is electrically connected to the snubber terminal.

Each of the m switch circuits (second switch circuits) 102M includes a switching element (second switching element) 1XM, a diode (second diode) 4XM, a capacitor (second capacitor) 3XM, a snubber terminal, a positive terminal, and a negative terminal.

Regarding the snubber terminal, positive terminal, and negative terminal, the terminals may be omitted as long as circuits are electrically connectable at the position of each terminal. The switch circuit 102M may include a plurality of switching elements 1XM. In this case, the switching elements 1XM are connected between the positive terminal and the negative terminal in parallel to the capacitor 3XM and the diode 4XM. The switching elements 1XM may be connected in series or parallel to each other.

The switching element 1XM is, for example, a MOSFET. The drain (high potential end) of the switching element 1XM is electrically connected to the positive terminal, and the source (low potential end) thereof is electrically connected to the negative terminal.

The diode 4XM has a cathode electrically connected to the negative terminal and the source of the switching element 1XM, and an anode electrically connected to the snubber terminal. The diode 4XM preferably has fast recovery characteristics with a low recovery loss, and is preferably an element using a schottky barrier diode (SBD) having good recovery characteristics or a wide bandgap semiconductor (such as SiC or GaN).

The capacitor 3XM has one end (high potential end) electrically connected to the positive terminal and the drain of the switching element 1XM, and another end (low potential end) electrically connected to the snubber terminal and the anode of the diode 4XM.

The m switch circuits 102M are connected in series. Namely, the positive terminal (high potential end) of each switch circuit 102M is electrically connected to the negative terminal (low potential end) of the adjacent switch circuit 102M on the high potential side. The positive terminal of the switch circuit 102M closest to the high potential end is electrically connected to the AC terminal U and the upper arm. In contrast, the negative terminal of each switch circuit 102M is electrically connected to the positive terminal of the adjacent switch circuit 102M on the low potential side. The negative terminal of the switch circuit 102M closest to the low potential end is electrically connected to the low potential end.

The m regenerative rectifier diodes 6XM (M=1 to m) are each connected between the snubber terminal of the second switch circuit 102M and the other end of the capacitor unit Crn on the low potential side, with their forward directions directed from the low potential side to the high potential side. In other words, the snubber terminal of the second switch circuit 102M is electrically connected to the cathode of the regenerative rectifier diode 6XM. The other end of the capacitor unit Crn is electrically connected to the anodes of the regenerative rectifier diodes 6X1 to 6Xm.

The resistor 5XM is connected, at one end, to a node between the diode 4XM and the capacitor 3XM (part of a structure electrically connecting the other end (low potential end) of the capacitor 3XM to the anode of the diode 4XM) in series. The other end of the resistor 5XM is electrically connected to the snubber terminal.

The U-phase leg 100U of the power conversion apparatus of the present embodiment includes first regenerative rectifier circuits each connecting the cathode of the first diode 4UN to the other end of the capacitor unit Crp on the high potential end, with the forward direction of the first diode 4UN directed from the first switch circuit 101U to the capacitor unit Crp on the high potential end, when at least one of the first switch circuits 101N includes a first diode 4UN having an anode connected to the high potential end of the first switching element 1UN and a first capacitor 3UN connected between the cathode of the first diode 4UN and the low potential end of the first switching element 1UN.

The U-phase leg 100U of the power conversion apparatus of the present embodiment includes second regenerative rectifier circuits each connecting the anode of the second diode 4XM to the other end of the capacitor unit Crn on the low potential end, with the forward direction of the second diode 4XM directed from the capacitor unit Crn on the low potential side to the second switch circuit 102M, when at least one of the second switch circuits 102M includes a second diode 4XM having a cathode connected to the low potential end of the second switching element 1XM and a second capacitor 3XM connected between the anode of the second diode 4XM and the high potential end of the second switching element 1XM.

In the power conversion apparatus of the present embodiment, the switching elements 1UN, 1XM are not limited to a MOSFET, and may be an insulated gate bipolar transistor (IGBT), a contactor, or a mechanical switch.

The advantages of the present embodiment can be attained even when elements with different voltage ratings or current ratings are used as the switching elements 1UN, 1XM; however, it is preferable to use elements with the same voltage rating or current rating as the switching elements 1UN, 1XM.

In the power conversion apparatus of the present embodiment, a closed circuit is formed by the high potential end, the low potential end, and the DC capacitor. A surge voltage may occur due to a parasitic inductance (not shown) parasitic on the closed circuit. At this time, the power conversion apparatus of the present embodiment can suppress a surge voltage generated at the capacitors 3UN, 3XM.

FIG. 2 is a diagram for illustrating a configuration example of the DC/DC converter and control circuit of the power conversion apparatus of the first embodiment.

In this example, the control circuit CP, CN acquires the voltage value of the capacitor unit Crp, Crn, and discharges the capacitor unit Crp, Crn so that the difference between the voltage value of the capacitor unit Crp, Crn and a command value becomes zero.

The DC/DC converter 10P, 10N is an isolated DC/DC converter including a switching element B4, an isolation transformer B3, a diode B2, and a capacitor B1.

The switching element B4 is, for example, a MOSFET. The source of the switching element B4 is electrically connected to the high potential end of the capacitor unit Crp (one end of the capacitor unit Crp, the other end of the capacitor unit Crn), and the drain of the switching element B4 is electrically connected to one end of a primary side coil of the insulation transformer B3. The gate potential of the switching element B4 is controlled by the control circuit CP, CN.

The isolation transformer B3 is, for example, a flyback transformer (two-winding reactor). The primary side coil of the isolation transformer B3 is connected between the drain of the switching element B4 and the low potential end of the capacitor unit Crp, Crn (the other end of the capacitor unit Crp, one end of the capacitor unit Crn). A secondary side coil of the isolation transformer B3 is connected between a high potential side output end and a low potential side output end.

The capacitor B1 is connected between the high potential side output end and the low potential side output end. The diode B2 is connected between the high potential end of the secondary side coil of the isolation transformer B3 and the high potential side output end.

While the switching element B4 is ON, energy is discharged from the capacitor unit Crp, Crn to the isolation transformer B3 in the DC/DC converter 10P, 10N and stored in the isolation transformer B3. Thereafter, when the switching element B4 is turned off, energy stored in the isolation transformer B3 is output to the secondary side by back electromotive force of the isolation transformer B3.

The control circuit CP, CN includes a subtractor A1, a gain multiplier A2, and a comparator A3.

The subtractor A1 calculates and outputs a difference obtained by subtracting the voltage value of the capacitor unit Crp, Crn from a command value externally input.

The gain multiplier A2 calculates and outputs a product obtained by multiplying the value output from the subtractor A1 by a predetermined gain.

The comparator A3 compares the product output from the gain multiplier A2 with a carrier wave, and generates and outputs a gate signal of the switching element B4.

According to the above-described control circuit CP, CN, the operation of the DC/DC converter 10P, 10N is controlled so that the voltage value of the capacitor unit Crp, Crn follows the command value.

FIG. 3 is a diagram for illustrating another configuration example of the DC/DC converter and control circuit of the power conversion apparatus of the first embodiment.

In this example, the control circuit CP, CN discharges the capacitor unit Crp, Crn so that a predetermined power is output from the DC/DC converter 10P, 10N.

The DC/DC converter 10P, 10N is an isolated DC/DC converter including a full-bridge circuit B9, a capacitor B8, an isolation transformer B7, a diode bridge circuit B6, a capacitor B5, and a NOT circuit B10.

The capacitor Crp, Crn is connected between DC main circuits of the full-bridge circuit B9.

The full-bridge circuit B9 includes, for example a MOSFET as a switching element. The full-bridge circuit B9 is controlled so that, for example, an upper switching element of one leg and a lower switching element of the other leg are simultaneously turned on and off, and an upper switching element and lower switching element of the same leg are not simultaneously turned on. The full-bridge circuit B9 can convert the DC voltage of the capacitor unit Crp, Crn into a single-phase AC voltage.

A primary side coil of the isolation transformer B7 is electrically connected to AC terminals of the full-bridge circuit B9 via the capacitor B8. A secondary side coil of the isolation transformer B7 is electrically connected to input terminals of the diode bridge circuit B6.

The diode bridge circuit B6 converts an AC voltage supplied from the full-bridge circuit B9 via the isolation transformer B7 into a DC voltage, and outputs the DC voltage.

The capacitor B5 is connected between output terminals of the diode bridge circuit B6. The DC voltage output from the diode bridge circuit B6 is smoothed by the capacitor B5, and output from the DC/DC converter 10P, 10N.

The NOT circuit B10 outputs a signal obtained by inverting the waveform of a gate signal output from the control circuit CP, CN. The signal output from the NOT circuit B10 is supplied to the full-bridge circuit B9 as a gate signal of the upper switching element of one leg of the full-bridge circuit B9 and a gate signal of the lower switching element of the other leg.

The control circuit CP, CN includes a pulse generating circuit A4.

The pulse generating circuit A4 outputs, for example, a pulse with a duty ratio of 50% as a gate signal. The gate signal output from the pulse generating circuit A4 is supplied to the NOT circuit B10 as well as to the gate of the lower switching element of one leg and the gate of the upper switching element of the other leg of the full-bridge circuit B9.

Next, an example of the operation of the power conversion apparatus of the present embodiment will be described.

The upper arm and the lower arm of each phase leg 100U, 100V, 100W operate in a similar manner to those in a conventional three-phase inverter circuit.

A plurality of switching elements 1UN, 1XM of each of the upper arm and lower arm of each phase leg 100U, 100V, 100W are controlled to sequentially perform switching at predetermined intervals so as to avoid simultaneous switching. At this time, a load current flows through the arm during a time (delay time) from when one of the switching elements 1UN, 1XM is turned on to when the next one is turned on. When the switching element 1UN, 1XM is OFF in the switch circuit 101N, 102M, the load current flows into the diode (rectifier device) 4UN, 4XM connected in parallel to the switching element 1UN, 1XM or into the regenerative rectifier circuit. The current that flows through the regenerative rectifier circuit is stored in the capacitor unit Crp, Crn as energy.

In each of the switching elements 1UN, 1VP, 1WQ of the upper arm of each phase leg 100U, 100V, 100W, by all of that switching element and the switching elements connected on the high potential side of that switching element being turned on, the capacitor 3UN, 3VP, 3WQ connected in parallel to that switching element is connected in parallel to the capacitor unit Crp. When the voltage of the capacitor 3UN, 3VP, 3WQ rises due to storage of energy of the load current, a current flows from the capacitor 3UN, 3VP, 3WQ to the capacitor unit Crp, and energy is discharged (regenerated) to the capacitor unit Crp. The regenerative efficiency of energy at this time depends on the voltage difference between the capacitor 3UN, 3VP, 3WQ and the capacitor unit Crp, and becomes higher as the voltage difference becomes smaller.

As described above, energy is collected in the capacitor unit Crp from all capacitors 3UN, 3VP, 3WQ of the upper arm. The energy stored in the capacitor unit Crp is discharged by the DC/DC converter 10P, and can be used for a DC power supply or a control power supply. In addition, since the energy stored in the capacitor unit Crp is discharged by the DC/DC converter 10P, the voltage of the capacitor unit Crp can be prevented from rising.

In each of the switching elements 1XM, 1YO, 1ZR of the lower arm of each of the phase legs 100U, 100V, 100W, as all of that switching element and the switching elements connected on the low potential side of that switching element are turned on, the capacitor 3XM, 3YO, 3ZR connected in parallel to that switching element is connected in parallel to the capacitor unit Crn. When the voltage of the capacitor 3XM, 3YO, 3ZR rises due to storage of energy of the load current, a current flows from the capacitor 3XM, 3YO, 3ZR to the capacitor unit Crn, whereby energy is discharged (regenerated) to the capacitor unit Crn. The regenerative efficiency of energy at this time depends on the voltage difference between the capacitor 3XM, 3YO, 3ZR and the capacitor unit Crn, and becomes higher as the voltage difference becomes smaller.

As described above, energy is collected in the capacitor unit Crn from all capacitors 3XM, 3YO, 3ZR of the lower arm. The energy stored in the capacitor unit Crn is discharged by the DC/DC converter 10N, and can be used for a DC power supply or a control power supply. In addition, since the energy stored in the capacitor unit Crn is discharged by the DC/DC converter 10N, the voltage of the capacitor unit Crn can be prevented from rising.

Next, an energy loss improvement effect by the power conversion apparatus of the present embodiment will be described. For example, in a conventional two-level inverter, when a switching element is turned on, the current that flows through the switching element increases, and the voltage applied to the switching element drops. Energy generated in the switching element by the current that flows through the switching element and the voltage applied to the switching element turns into heat without being absorbed by another element, thereby causing a switching loss.

In contrast, in the power conversion apparatus of the present embodiment, energy is generated at the time of turning on as in the conventional apparatus when viewed from the perspective of each switching element, whereas energy generated at the time of switching is absorbed in the capacitor unit Crp, Crn through the capacitor 3UN, 3XM when viewed from the perspective of the entire arm. The energy stored in the capacitor unit Crp, Crn is discharged and regenerated by the DC/DC converter 10$p$, 10N. Therefore, only part of the energy generated when the switching element 1UN, 1XM is turned on is lost from the perspective of the entire arm, and the energy efficiency is improved.

In addition, in a conventional two-level inverter for example, when a switching element is turned off, the voltage applied to the switching element rises, and the current that flows through the switching element decreases. Therefore, energy generated in the switching element by the current that flows through the switching element and the voltage applied to the switching element turns into heat without being absorbed by another element, thereby causing a switching loss.

In contrast, in the power conversion apparatus of the present embodiment, energy is generated at the time of turning off as in the conventional apparatus when viewed from the perspective of each switching element, whereas energy generated at the time of switching is absorbed in the capacitor unit Crp, Crn through the capacitor 3UN, 3XM when viewed from the perspective of the entire arm. The energy stored in the capacitor unit Crp, Crn is discharged and regenerated by the DC/DC converter 10P, 10N. Therefore, only part of the energy generated when the switching element 1UN, 1XM is turned off is lost from the perspective of the entire arm, and the energy efficiency is improved.

Also, in a conventional two-level inverter for example, when a low-arm switching element is turned on, a recovery loss is caused by the current that flows through a parasitic diode of an upper-arm switching element and the voltage applied thereto at the time of recovery of the parasitic diode.

In contrast, in the power conversion apparatus of the present embodiment, for example when one of the switching elements 1XM is turned on, the voltage applied to one of a plurality of switch circuits 102M is divided by a series number (=n) of switch circuits 101N, and is applied to each of the switch circuits 101N. Therefore, the voltage applied at the time of recovery of the parasitic diodes of the switching elements 1UN of the switch circuits 101N decreases, and the loss (recovery loss) caused at the time of recovery is reduced.

As described above, the power conversion apparatus of the present embodiment implements highly efficient switching by enabling a regenerative use of energy that is lost in a conventional two-level inverter. Also, in the power conversion apparatus of the present embodiment, the switching speed of the switching element 1UN, 1VP, 1WQ, 1XM, 1YO, 1ZR is the same as that in a conventional two-level inverter; accordingly, the loss can be reduced without increasing the switching speed.

In addition, the capacitor units Crp, Crn and the DC/DC converters 10P, 10N need not be provided for each phase. Even if the power conversion apparatus has multiple phases (four or more phases), the power conversion apparatus can be implemented by providing one capacitor unit and one DC/DC converter on each of the high potential side and the low potential side. This enables reduction in size and cost of the power conversion apparatus.

Accordingly, the present embodiment can provide a power conversion apparatus and switch apparatus that can suppress the energy loss and avoid an increase in size.

Next, a power conversion apparatus of a second embodiment will be described in detail with reference to drawings.

FIG. 4 is a schematic diagram showing a configuration example of the power conversion apparatus of the second embodiment.

The power conversion apparatus of the present embodiment differs from that of the first embodiment in terms of not including the capacitor unit Crp, DC/DC converter 10P, or control circuit CP on the high potential side. In the absence of these components, the configurations of the switch circuits 101N, 101P, 101Q of the upper arms and the configurations of the regenerative rectifier circuits differ from those of the power conversion apparatus of the first embodiment.

In the power conversion apparatus of the present embodiment, the switch circuits 101N, 101P, 101Q of the upper arms have configurations similar to those of the switch circuits 102M, 1020, 102R of the lower arms.

The configuration of the switch circuit 101N of the upper arm of the U phase will be described below. Since the configurations of the V phase and the W phase are similar to that of the U phase, descriptions thereof will be omitted.

The switching element 1UN is, for example, a MOSFET. The drain (high potential end) of the switching element 1UN is electrically connected to the positive terminal, and the source (low potential end) thereof is electrically connected to the negative terminal.

The diode 4UN has a cathode electrically connected to the negative terminal and the source of the switching element 1UN, and an anode electrically connected to the snubber terminal. The diode 4UN preferably has fast recovery characteristics with a low recovery loss, and is preferably an element using a schottky barrier diode (SBD) having good recovery characteristics or a wide bandgap semiconductor (such as SiC or GaN).

The capacitor 3UN has one end (high potential end) electrically connected to the positive terminal and the drain of the switching element 1UN, and another end (low potential end) electrically connected to the snubber terminal and the anode of the diode 4UN.

The n switch circuits 101N are connected in series. Namely, the positive terminal (high potential end) of each switch circuit 101N is electrically connected to the negative terminal (low potential end) of the adjacent switch circuit 101N on the high potential side. The positive terminal of the switch circuit 101N (N=n) closest to the high potential end is electrically connected to the high potential end. In contrast, the negative terminal of each switch circuit 101N is electrically connected to the positive terminal of the adjacent switch circuit 101N on the low potential side. The negative terminal of the switch circuit 101N (N=1) closest to the low potential end is electrically connected to the AC terminal U and the lower arm.

The n regenerative rectifier diodes 6UN (N=1 to n) are each connected between the snubber terminal of the first switch circuit 101N and the cathode of the regenerative rectifier diode 6X1, with their forward directions directed from the low potential side to the high potential side. In other words, the snubber terminal of the first switch circuit 101N is electrically connected to the cathode of the regenerative rectifier diode 6UN. The cathode of the regenerative rectifier diode 6X1 is electrically connected to the anodes of the regenerative rectifier diodes 6U1 to 6Un.

The resistor 5UN is connected, at one end, to a node between the diode 4UN and the capacitor 3UN (part of structure electrically connecting the other end (low potential end) of the capacitor 3UN to the anode of the diode 4UN) in series. The other end of the resistor 5UN is electrically connected to the snubber terminal.

In the power conversion apparatus of the present embodiment, the first regenerative rectifier circuit is electrically connected to the capacitor unit Crn via the regenerative rectifier diode 6X1 of the second regenerative rectifier circuit, as described above. Therefore, part of the energy generated by the operation of the upper arm is collected in the capacitor unit Crn on the low potential side.

That is, energy is collected in the capacitor unit Crn from all of the switch circuits 101N, 101P, 101Q, 102M, 102O, 102R included in the power conversion apparatus. Therefore, the capacitor unit Crn of the power conversion apparatus of the present embodiment preferably has a larger capacity than that of the power conversion apparatus of the first embodiment.

The above configuration implements highly-efficient switching by enabling regenerative use of energy that is lost in a conventional two-level inverter, as in the first embodiment. Also, in the power conversion apparatus of the present embodiment, the switching speed of each switching element 1UN, 1VP, 1WQ, 1XM, 1YO, 1ZR is the same as that in a conventional two-level inverter; accordingly, the loss can be reduced without increasing the switching speed.

In addition, the capacitor unit Crn and the DC/DC converter 10N need not be provided for each phase. Even if the power conversion apparatus has multiple phases (four or more phases), the power conversion apparatus can be implemented by providing one capacitor unit and one DC/DC converter on the low potential side. This enables reduction in size and cost of the power conversion apparatus.

Accordingly, the present embodiment can provide a power conversion apparatus and switch apparatus that can suppress the energy loss and avoid an increase in size.

In the example shown in FIG. 4, the power conversion apparatus is configured to collect energy in the capacitor unit Crn on the low potential side from all of the switch circuits 101N, 101P, 101Q, 102M, 102O, 102R while omitting the capacitor unit Crp on the high potential side; however, the power conversion apparatus may be configured to include the capacitor unit Crp on the high potential side while omitting the capacitor unit Crn on the low potential side. In this case, the power conversion apparatus is configured so that the switch circuit 102M, 102O, 102R of the lower arm of each phase has a configuration similar to that of the switch circuit 101N, 101P, 101Q of the upper arm of the power conversion apparatus of the first embodiment, and the second regenerative rectifier circuit, fourth regenerative rectifier circuit, and sixth regenerative rectifier circuit are connected to the capacitor unit Crp via the regenerative rectifier diode 6U1. Regarding the lower arm of the U phase for example, the cathodes of the regenerative rectifier diodes 6X1 to 6Xm are electrically connected to the anode of the regenerative rectifier diode 6U1. The anodes of the regenerative rectifier diodes 6X1 to 6Xm are electrically connected to the snubber terminal of the switch circuit 102M. The lower arms of the V phase and the W phase have similar configurations.

With the above configuration, the capacitor unit Crp of the power conversion apparatus preferably has a larger capacity than that of the power conversion apparatus of the first embodiment, as energy is collected therein from all of the switch circuits 101N, 101P, 101Q, 102M, 102O, 102R included in the power conversion apparatus.

The above-described configuration can attain advantages similar to those of the example shown in FIG. 4. That is, the present embodiment can provide a power conversion apparatus and switch apparatus that can suppress the energy loss and avoid an increase in size.

Next, a power conversion apparatus of a third embodiment will be described in detail with reference to a drawing.

FIG. 5 is a schematic diagram showing a configuration example of the power conversion apparatus of the third embodiment.

The power conversion apparatus of the present embodiment is a boost power conversion apparatus.

The power conversion apparatus of the present embodiment includes a reactor LA, a diode DA, a plurality of switch circuits SA1-SA4, a regenerative rectifier circuit (a plurality of regenerative rectifier diodes 6A1-6A4 and a plurality of resistors 5A1-5A4), a capacitor unit Crn, a DC/DC converter 10N, and a control circuit CN.

In the power conversion apparatus of the present embodiment, the reactor LA and the diode DA are connected in series between an input end and a high potential end.

The capacitor unit Crn has one end electrically connected to a low potential end and another end electrically connected to the regenerative rectifier circuit.

The DC/DC converter 10N converts energy stored in the capacitor unit Crn into a predetermined voltage to discharge the capacitor unit Crn. The DC/DC converter 10N may be connected to, for example, a control power supply, a DC power supply of the power conversion apparatus, or another circuit, which is not shown.

The control circuit CN can, for example, control the operation of the DC/DC converter 10N. The control circuit CN may perform control so that, for example, the voltage of the capacitor unit Crn takes a predetermined value.

The configurations of the DC/DC converter 10N and control circuit CN are similar to those of the power conversion apparatus of the first embodiment.

The diode DA has an anode electrically connected to the reactor LA and a cathode electrically connected to the high potential end.

The switch circuits SA1-SA4 are connected in series between the low potential end and a node between the reactor LA and the diode DA.

The switch circuits SA1-SA4 each have a configuration similar to that of the switch circuit 102M of the lower arm of the power conversion apparatus of the first embodiment.

The switch circuits SA1-SA4 each include a switching element 1A1-1A4, a diode 4A1-4A4, and a capacitor 3A1-3A4. The switch circuits SA1-SA4 each may include a snubber terminal, a positive terminal, and a negative terminal, although these terminals are not shown.

The switching element 1A1-1A4 is, for example, MOSFET. The switching elements 1A1-1A4 are connected in series between the low potential end and the anode of the diode DA with its drain on the high potential side and source on the low potential side.

The diode 4A1-4A4 has a cathode electrically connected to the source of the switching element 1A1-1A4 and an anode electrically connected to the regenerative rectifier circuit and the low potential end of the capacitor 3A1-3A4.

The capacitor 3A1-3A4 has one end (high potential end) electrically connected to the drain of the switching element 1A1-1A4, and another end (low potential end) electrically connected to the regenerative rectifier circuit and the anode of the diode 4A1-4A4.

The regenerative rectifier diodes 6A1-6A4 are each connected between the low potential end of the capacitor 3A1-3A4 of the switch circuit SA1-SA4 and the other end of the capacitor Crn, with their forward directions directed from the low potential side to the high potential side. In other words, the low potential end of the capacitor 3A1-3A4 is electrically connected to the cathode of the regenerative rectifier diode 6A1-6A4 via the resistor 5A1-5A4. The other end of the capacitor unit Crn is electrically connected to the anode of the regenerative rectifier diode 6A1-6A4.

The resistor 5A1-5A4 is connected, at one end, to a node between the diode 4A1-4A4 and the capacitor 3A1-3A4 (part of a structure electrically connecting the low potential end of the capacitor 3A1-3A4 to the anode of the diode 4A1-4A4) in series. The other end of the resistor 5A1-5A4 is electrically connected to the cathode of the regenerative rectifier diode 6A1-6A4.

With the above-described configuration, part of the energy generated by the operations of the switch circuits SA1-SA4 included in the power conversion apparatus is stored in the capacitor unit Crn, as in the first embodiment. The energy stored in the capacitor unit Crn is made available by the DC/DC converter 10N for a DC power supply or a control power supply.

The power conversion apparatus of the present embodiment can attain advantages similar to those of the first embodiment. That is, the present embodiment can provide a power conversion apparatus and switch apparatus that can suppress the energy loss and avoid an increase in size.

A bridgeless PFC circuit can be configured by using the configuration of the diode DA and switch circuits SA1-SA4 shown in FIG. 5, for example. In this case, two legs each including the diode DA and switch circuits SA1-SA4 are connected between the high potential end and the low potential end, and an AC power supply is connected via the reactor LA between the upper arm and lower arm of one leg and between the upper arm and lower arm of the other leg. Even in the case of the bridgeless PFC circuit, advantages similar to those of the above-described power conversion apparatus can be attained by connecting a regenerative rectifier circuit to the switch circuits SA1-SA4 of the two legs, connecting one end of the capacitor unit Crn to the low potential end, and connecting the other end of the capacitor unit Crn to two regenerative rectifier circuits.

In the present embodiment, the rectifier device may be replaced with a MOSFET for synchronous rectification.

Next, a power conversion apparatus of a fourth embodiment will be described in detail with reference to a drawing.

FIG. 6 is a schematic diagram showing a configuration example of the power conversion apparatus of the fourth embodiment.

The power conversion apparatus of the present embodiment is a buck power conversion apparatus.

The power conversion apparatus of the present embodiment includes a reactor LB, a diode DB, a plurality of switch circuits SB1-SB4, a regenerative rectifier circuit (a plurality of regenerative rectifier diodes 6B1-6B4 and a plurality of resistors 5B1-5B4), a capacitor unit Crp, a DC/DC converter 10*p*, and a control circuit CP.

In the power conversion apparatus of the present embodiment, the diode DB and the reactor LB are connected in series between a low potential end and an output end.

The capacitor unit Crp has one end electrically connected to a high potential end and another end electrically connected to the regenerative rectifier circuit.

The DC/DC converter 10P converts energy stored in the capacitor unit Crp into a predetermined voltage to discharge the capacitor unit Crp. The DC/DC converter 10P may be connected to, for example, a control power supply, a DC power supply of the power conversion apparatus, or another circuit, which is not shown.

The control circuit CP can, for example, control the operation of the DC/DC converter 10P. The control circuit CP may perform control so that, for example, the voltage of the capacitor unit Crp takes a predetermined value.

The configurations of the DC/DC converter 10P and control circuit CP are similar to those of the power conversion apparatus of the first embodiment.

The diode DB has an anode electrically connected to the low potential end and a cathode electrically connected to the reactor LB.

The switch circuits SB1-SB4 are connected in series between the high potential end and a node between the reactor LB and the diode DB.

The switch circuits SB1-SB4 each have a configuration similar to that of the switch circuit 101N of the upper arm of the power conversion apparatus of the first embodiment.

The switch circuits SB1-SB4 each include a switching element 1B1-1B4, a diode 4B1-4B4, and a capacitor 3B1-3B4. The switch circuits SB1-SB4 each may include a snubber terminal, a positive terminal, and a negative terminal, although these terminals are not shown.

The switching element 1B1-1B4 is, for example, a MOSFET. The switching elements 1B1-1B4 are connected in series between the high potential end and the cathode of the diode DB with its drain on the high potential side and source on the low potential side.

The diode 4B1-4B4 has an anode electrically connected to the drain of the switching element 1B1-1B4 and a cathode electrically connected to the regenerative rectifier circuit and the high potential end of the capacitor 3B1-3B4.

The capacitor 3B1-3B4 has one end (low potential end) electrically connected to the source of the switching element 1B1-1B4, and another end (high potential end) electrically connected to the regenerative rectifier circuit and the cathode of the diode 4B1-4B4.

The regenerative rectifier diodes 6B1-6B4 are each connected between the high potential end of the capacitor 3B1-3B4 of the switch circuit SB1-SB4 and the other end of the capacitor Crp, with their forward directions directed from the low potential side to the high potential side. In other words, the high potential end of the capacitor 3B1-3B4 is electrically connected to the anode of the regenerative rectifier diode 6B1-6B4 via the resistor 5B1-5B4. The other end of the capacitor unit Crp is electrically connected to the cathode of the regenerative rectifier diode 6B1-6B4.

The resistor 5B1-5B4 is connected, at one end, to a node between the diode 4B1-4B4 and the capacitor 3B1-3B4 (part of a structure electrically connecting the other end (high potential end) of the capacitor 3B1-3B4 to the cathode of the diode 4B1-4B4) in series. The other end of the resistor 5B1-5B4 is electrically connected to the anode of the regenerative rectifier diode 6B1-6B4.

With the above-described configuration, part of the energy generated by the operations of the switch circuits SB1-SB4 included in the power conversion apparatus is stored in the capacitor unit Crp, as in the first embodiment. The energy stored in the capacitor unit Crp is made available by the DC/DC converter 10P for a DC power supply or a control power supply.

The power conversion apparatus of the present embodiment can attain advantages similar to those of the first embodiment. That is, the present embodiment can provide a power conversion apparatus and switch apparatus that can suppress the energy loss and avoid an increase in size.

Next, a power conversion apparatus of a fifth embodiment will be described in detail with reference to drawings.

Figure 7:
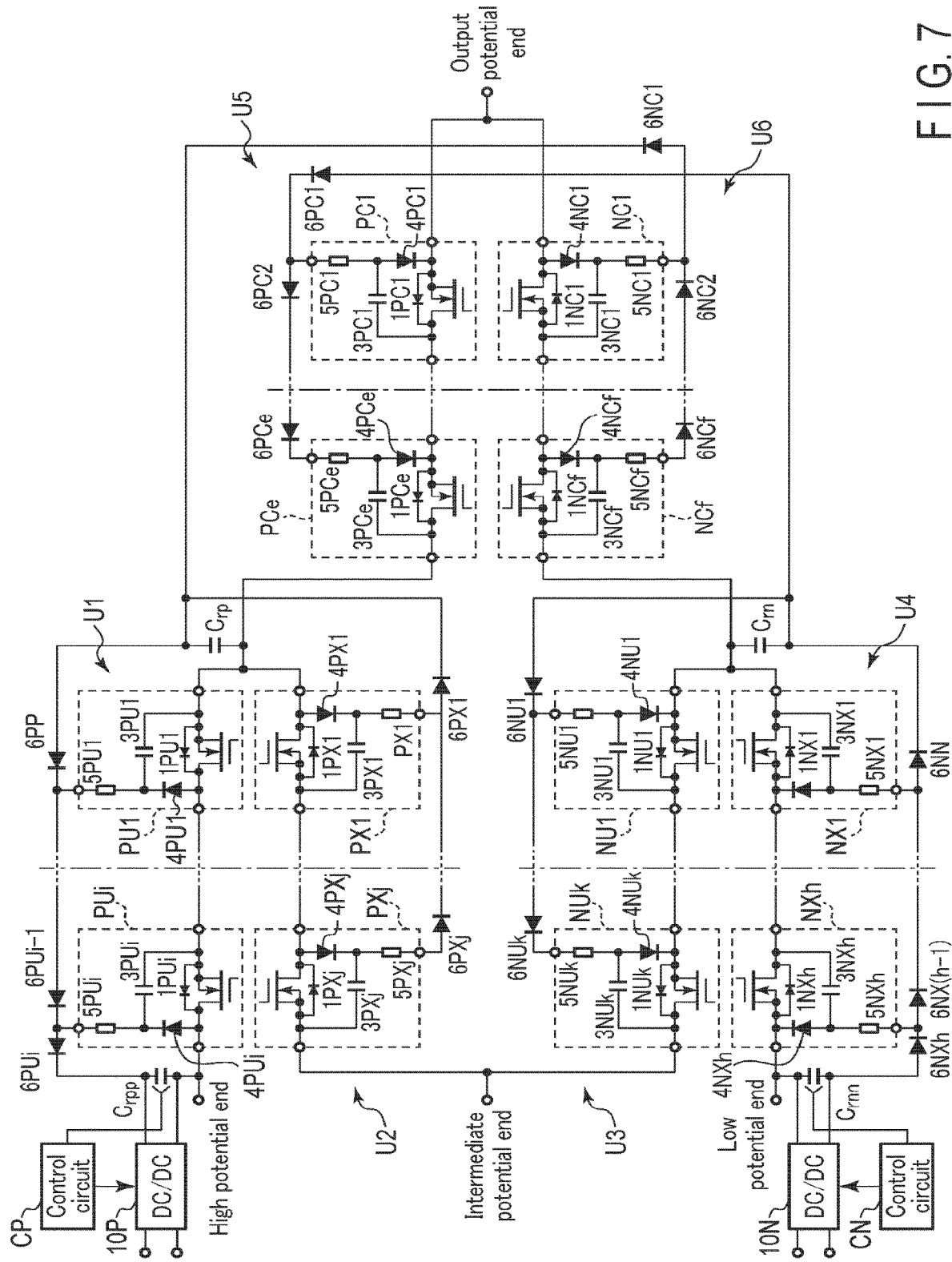
FIG. 7 is a schematic diagram showing a configuration example of a power conversion apparatus of a fifth embodiment.

FIG. 7 is a schematic diagram showing a configuration example of the power conversion apparatus of the fifth embodiment.

The power conversion apparatus of the present embodiment is a neutral point clamped (NPC) power conversion apparatus. A device connected to an intermediate potential end of the NPC power conversion apparatus may be a rectifier device.

The power conversion apparatus of the present embodiment includes first to sixth arms U1-U6, capacitor units Crp, Crn, Crpp, Crnn, DC/DC converters 10P, 10N, control circuits CP, CN, first to third high potential side regenerative rectifier circuits, first to third low potential side regenerative rectifier circuits, and regenerative rectifier diodes 6PP, 6NN.

The first arm U1 and the second arm U2 are connected in series between a high potential end and the intermediate potential end. The first arm U1 is arranged on the high potential side of the second arm U2.

The third arm U3 and the fourth arm U4 are connected in series between the intermediate potential end and a low potential end. The fourth arm U4 is arranged on the low potential side of the third arm U3.

The fifth arm U5 is connected between an output potential end and a node between the first arm U1 and the second arm U2.

The sixth arm U6 is connected between the output potential end and a node between the third arm U3 and the fourth arm U4.

The first arm U1 includes a plurality of switch circuits PUI (I=1 to i).

The switch circuits PUI each have a configuration similar to that of the switch circuit 101N of the power conversion apparatus of the first embodiment. The switch circuits 101N are connected in series between the high potential end and the second arm U2.

The second arm U2 includes a plurality of switch circuits PXJ (J=1 to j).

The switch circuits PXJ each have a configuration similar to that of the switch circuit 101N of the power conversion apparatus of the first embodiment. The switch circuits PXJ are connected in series between the intermediate potential end and the first arm U1.

The third arm U3 includes a plurality of switch circuits NUK (K=1 to k).

The switch circuits NUK each have a configuration similar to that of the switch circuit 102M of the power conversion apparatus of the first embodiment. The switch circuits NUK are connected in series between the intermediate potential end and the fourth arm U4.

The fourth arm U4 includes a plurality of switch circuits NXH (H=1 to h).

The switch circuits NXH each have a configuration similar to that of the switch circuit 102M of the power conversion apparatus of the first embodiment. The switch circuits NXH are connected in series between the third arm U3 and the low potential end.

The fifth arm U5 includes a plurality of switch circuits PCE (E=1 to e).

The switch circuits PCE each have a configuration similar to that of the switch circuit 102M of the power conversion apparatus of the first embodiment. The switch circuits PCE are connected in series between the output potential end and the node between the first arm U1 and the second arm U2.

The sixth arm U6 includes a plurality of switch circuits NCF (F=1 to f).

The switch circuits NCF each have a configuration similar to that of the switch circuit 101N of the power conversion apparatus of the second embodiment. The switch circuits NCF are connected in series between the output potential end and the node between the third arm U3 and the fourth arm U4.

The first high potential side regenerative rectifier circuit includes a plurality of regenerative rectifier diodes 6PUI (I=1 to i), a regenerative rectifier diode 6PP, and a plurality of resistors 5PUI.

The regenerative rectifier diodes 6PUI are connected in series to each other between the other end of the capacitor unit Crp and the other end of the capacitor unit Crpp, with their forward directions directed from the low potential side to the high potential side. The anode of each of the regenerative rectifier diodes 6PUI is electrically connected to the snubber terminal of the switch circuit PUI and the cathode of the adjacent regenerative rectifier diode 6PUI on the low potential side. For example, the anode of the regenerative rectifier diode 6PU2 is electrically connected to the snubber terminal of the switch circuit PU2 and the cathode of the regenerative rectifier diode 6PU1. The anode of the regenerative rectifier diode 6PU1 is electrically connected to the other end of the capacitor unit Crp via the snubber terminal of the switch circuit PU1 and the regenerative rectifier diode 6PP.

The regenerative rectifier diode 6PP is connected between the other end of the capacitor unit Crpp and the other end of the capacitor unit Crp, with its forward direction directed from the other end of the capacitor unit Crp to the other end of the capacitor unit Crpp.

The resistor 5PUI is connected, at one end, to each of the diode 4PUI and the capacitor 3PUI in series. The other end of the resistor 5PUI is electrically connected, via the regenerative rectifier diode 6PUI, to a circuit in which the capacitor 3PUI and resistor 5PUI of the switch circuit PUI connected on the low potential side are connected in series. The other end of the resistor 5PUI of the switch circuit PUI (I=1) closest to the low potential end is electrically connected to the other end of the capacitor unit Crp via the regenerative rectifier diode 6PP. The other end of the resistor 5PUI of the switch circuit PUI (I=i) closest to the high potential end is electrically connected to the other end of the capacitor unit Crpp via the regenerative rectifier diode 6PUI.

The second high potential side regenerative rectifier circuit includes a plurality of regenerative rectifier diodes 6PXJ (J=1 to j) and a plurality of resistors 5PXJ.

The regenerative rectifier diodes 6PXJ are connected in series with each other between the other end of the capacitor unit Crp and the snubber terminal of the switch circuit PXj, with their forward directions directed from the low potential side to the high potential side. The anode of each of the regenerative rectifier diodes 6PXJ is electrically connected to the snubber terminal of the switch circuit PXJ and the cathode of the adjacent regenerative rectifier diode 6PXJ on the low potential side. For example, the anode of the regenerative rectifier diode 6PX2 is electrically connected to the snubber terminal of the switch circuit PX2 and the cathode of the regenerative rectifier diode 6PX1. The anode of the regenerative rectifier diode 6PX1 is electrically connected to the snubber terminal of the switch circuit PX1. The cathode of the regenerative rectifier diode 6PXJ (J=1) closest to the high potential end is electrically connected to the other end of the capacitor unit Crp.

The resistor 5PXJ is connected, at one end, to each of the diode 4PXJ and the capacitor 3PXJ in series. The other end of the resistor 5PXJ is electrically connected, via the regenerative rectifier diode 6PXJ, to a circuit in which the capacitor 3PXJ and resistor 5PXJ of the switch circuit PXJ connected on the low potential side are connected in series. The other end of the resistor 5PXJ of the switch circuit PXJ (J=j) closest to the high potential end is electrically connected to the other end of the capacitor unit Crp via the regenerative rectifier diode 6PXJ.

The third high potential side regenerative rectifier circuit includes a plurality of regenerative rectifier diodes 6NCF (F=1 to f) and a plurality of resistors 5NCF.

The regenerative rectifier diodes 6NCF are connected in series to each other between the other end of the capacitor unit Crp and the snubber terminal of the switch circuit NCf, with their forward directions directed from the low potential side to the high potential side. The anode of each of the regenerative rectifier diodes 6NCF is electrically connected to the snubber terminal of the switch circuit NCF and the cathode of the adjacent regenerative rectifier diode 6NCF on the low potential side. For example, the anode of the regenerative rectifier diode 6NC2 is electrically connected to the snubber terminal of the switch circuit NC2 and the cathode of the regenerative rectifier diode 6NC1. The anode of the regenerative rectifier diode 6NC1 is electrically connected to the snubber terminal of the switch circuit NC1. The cathode of the regenerative rectifier diode 6NCF (F=1) closest to the high potential end is electrically connected to the other end of the capacitor unit Crp.

The resistor 5NCF is connected, at one end, to each of the diode 4NCF and the capacitor 3NCF in series. The other end of the resistor 5NCF is electrically connected, via the regenerative rectifier diode 6NCF, to a circuit in which the capacitor 3NCF and resistor 5NCF of the switch circuit NCF connected on the low potential side are connected in series. The other end of the resistor 5NCF of the switch circuit NCF (F=1) closest to the high potential end is electrically connected to the other end of the capacitor unit Crp via the regenerative rectifier diode 6NCF.

The first low potential side regenerative rectifier circuit includes a plurality of regenerative rectifier diodes 6NXH (H=1 to h), a regenerative rectifier diode 6NN, and a plurality of resistors 5NXH.

The regenerative rectifier diodes 6NXH are connected in series to each other between the other end of the capacitor unit Crnn and the other end of the capacitor unit Crn, with their forward directions directed from the low potential side to the high potential side. The cathode of each of the regenerative rectifier diodes 6NXH is electrically connected to the snubber terminal of the switch circuit NXH and the anode of the adjacent regenerative rectifier diode 6NXH on the high potential side. For example, the cathode of the regenerative rectifier diode 6NX2 is electrically connected to the snubber terminal of the switch circuit PU2 and the anode of the regenerative rectifier diode 6NX1. The cathode of the regenerative rectifier diode 6NX1 is electrically connected to the other end of the capacitor unit Crn via the snubber terminal of the switch circuit NX1 and the regenerative rectifier diode 6NN.

The regenerative rectifier diode 6NN is connected between the other end of the capacitor unit Crnn and the other end of the capacitor unit Crn, with its forward direction directed from the other end of the capacitor unit Crnn to the other end of the capacitor unit Crn.

The resistor 5NXH is connected, at one end, to each of the diode 4NXH and the capacitor 3NXH in series. The other end of the resistor 5NXH is electrically connected, via the regenerative rectifier diode 6NXH, to a circuit in which the capacitor 3NXH and resistor 5NXH of the switch circuit NXH connected on the low potential side are connected in series. The other end of the resistor 5NXH of the switch circuit NXH (H=1) closest to the high potential end is electrically connected to the other end of the capacitor unit Crn via the regenerative rectifier diode 6NN. The other end of the resistor 5NXH of the switch circuit NXH (H=h) closest to the low potential end is electrically connected to the other end of the capacitor unit Crnn via the regenerative rectifier diode 6NXH.

The second low potential side regenerative rectifier circuit includes a plurality of regenerative rectifier diodes 6NUK (K=1 to k) and a plurality of resistors 5NUK.

The regenerative rectifier diodes 6NUK are connected in series to each other between the other end of the capacitor unit Crn and the snubber terminal of the switch circuit NUk, with their forward directions directed from the low potential side to the high potential side. The cathode of each of the regenerative rectifier diodes 6NUK is electrically connected to the snubber terminal of the switch circuit NUK and the cathode of the adjacent regenerative rectifier diode 6NUK on the high potential side. For example, the cathode of the regenerative rectifier diode 6NU1 is electrically connected to the snubber terminal of the switch circuit NU1 and the anode of the regenerative rectifier diode 6PX2. The cathode of the regenerative rectifier diode 6PXh is electrically connected to the snubber terminal of the switch circuit NUh. The anode of the regenerative rectifier diode 6NUK (K=1) closest to the low potential end is electrically connected to the other end of the capacitor unit Crn.

The resistor 5NUK is connected, at one end, to each of the diode 4NUK and the capacitor 3NUK in series. The other end of the resistor 5NUK is electrically connected, via the regenerative rectifier diode 6NUK, to a circuit in which the capacitor 3NUK and resistor 5NUK of the switch circuit NUK connected on the low potential side are connected in series. The other end of the resistor 5NUK of the switch circuit NUK (K=1) closest to the low potential end is electrically connected to the other end of the capacitor unit Crn via the regenerative rectifier diode 6NUK.

The third low potential side regenerative rectifier circuit includes a plurality of regenerative rectifier diodes 6PCE (E=1 to e) and a plurality of resistors 5PCE.

The regenerative rectifier diodes 6PCE are connected in series to each other between the other end of the capacitor unit Crn and the snubber terminal of the switch circuit PCe, with their forward directions directed from the low potential side to the high potential side. The cathode of each of the regenerative rectifier diodes 6PCE is electrically connected to the snubber terminal of the switch circuit PCE and the anode of the adjacent regenerative rectifier diode 6PCE on the high potential side. For example, the cathode of the regenerative rectifier diode 6PC1 is electrically connected to the snubber terminal of the switch circuit PC1 and the anode of the regenerative rectifier diode 6PC2. The cathode of the regenerative rectifier diode 6PCe is electrically connected to the snubber terminal of the switch circuit PCe. The anode of the regenerative rectifier diode 6PCE (E=1) closest to the low potential end is electrically connected to the other end of the capacitor unit Crn.

The resistor 5PCE is connected, at one end, to each of the diode 4PCE and the capacitor 3PCE in series. The other end of the resistor 5PCE is electrically connected, via the regenerative rectifier diode 6PCE, to a circuit in which the capacitor 3PCE and resistor 5PCE of the switch circuit PCE connected on the low potential side are connected in series. The other end of the resistor 5PCE of the switch circuit PCE (E=1) closest to the low potential end is electrically connected to the other end of the capacitor unit Crn via the regenerative rectifier diode 6PCE.

In the power conversion apparatus of the present embodiment, the regenerative rectifier diode 6PCE included in the third low potential side regenerative rectifier circuit connected between the fifth arm U5 and the capacitor unit Crn preferably has a pressure resistance corresponding to the series number of the switch circuits NCF of the sixth arm U6. Also, the regenerative rectifier diode 6NCF included in the third high potential side regenerative rectifier circuit connected between the sixth arm U6 and the capacitor unit Crp preferably has a pressure resistance corresponding to the series number of the switch circuits PCE of the fifth arm U5.

One end of the capacitor unit Crp is electrically connected to the high potential end of the fifth arm U5. The other end of the capacitor unit Crp is electrically connected to the high potential end of the third high potential side regenerative rectifier circuit, the high potential end of the second high potential side regenerative rectifier circuit, and the low potential end of the first high potential side regenerative rectifier circuit.

One end of the capacitor unit Crn is electrically connected to the low potential end of the sixth arm U6. The other end of the capacitor unit Crn is electrically connected to the low potential end of the third low potential side regenerative rectifier circuit, the low potential end of the second low potential side regenerative rectifier circuit, and the high potential end of the first low potential side regenerative rectifier circuit.

One end of the capacitor unit Crpp is electrically connected to the high potential end of the first arm U1. The other end of the capacitor unit Crpp is electrically connected to the high potential end of the first high potential side regenerative rectifier circuit.

One end of the capacitor unit Crnn is electrically connected to the low potential end of the fourth arm U4. The other end of the capacitor unit Crnn is electrically connected to the low potential end of the first low potential side regenerative rectifier circuit.

In the power conversion apparatus of the present embodiment, part of the energy generated by the switching operations of the first arm U1, the second arm U2, and the sixth arm U6 is stored in the capacitor unit Crpp, whereas part of the energy generated by the switching operations of the third arm U3, the fourth arm U4, and the fifth arm U5 is stored in the capacitor unit Crnn.

The energy generated by switching of the first arm U1 is directly regenerated to the capacitor unit Crpp, the energy generated by switching of the second arm U2 and the sixth arm U6 is stored in the capacitor unit Crp and then is regenerated from the capacitor unit Crp to the capacitor unit Crpp by the first arm U1 being turned on.

The energy generated by switching of the fourth arm U4 is directly regenerated to the capacitor unit Crnn, the energy generated by switching of the third arm U3 and the fifth arm U5 is stored in the capacitor unit Crn and then is regenerated from the capacitor unit Crn to the capacitor unit Crnn by the fourth arm U4 being turned on.

The DC/DC converter 10P converts energy stored in the capacitor unit Crpp into a predetermined voltage to discharge the capacitor unit Crpp. The DC/DC converter 10P may be connected to, for example, a control power supply, a DC power supply of the power conversion apparatus, or another circuit, which is not shown.

The control circuit CP can, for example, control the operation of the DC/DC converter 10P. The control circuit CP may perform control so that, for example, the voltage of the capacitor unit Crpp takes a predetermined value.

The DC/DC converter 10N converts energy stored in the capacitor unit Crnn into a predetermined voltage to discharge the capacitor unit Crnn. The DC/DC converter 10N may be connected to, for example, a control power supply, a DC power supply of the power conversion apparatus, or another circuit, which is not shown.

The control circuit CN can, for example, control the operation of the DC/DC converter 10N. The control circuit CN may perform control so that, for example, the voltage of the capacitor unit Crnn takes a predetermined value.

The configurations of the DC/DC converters 10P, 10N and control circuits CP, CN are similar to those of the power conversion apparatus of the first embodiment.

As described above, the power conversion apparatus of the present embodiment can highly efficiently regenerate part of the energy that is lost in a conventional NPC power conversion apparatus, and can realize reduction in the energy loss.

Next, an example of the operation of the power conversion apparatus of the present embodiment will be described.

Figure 8:
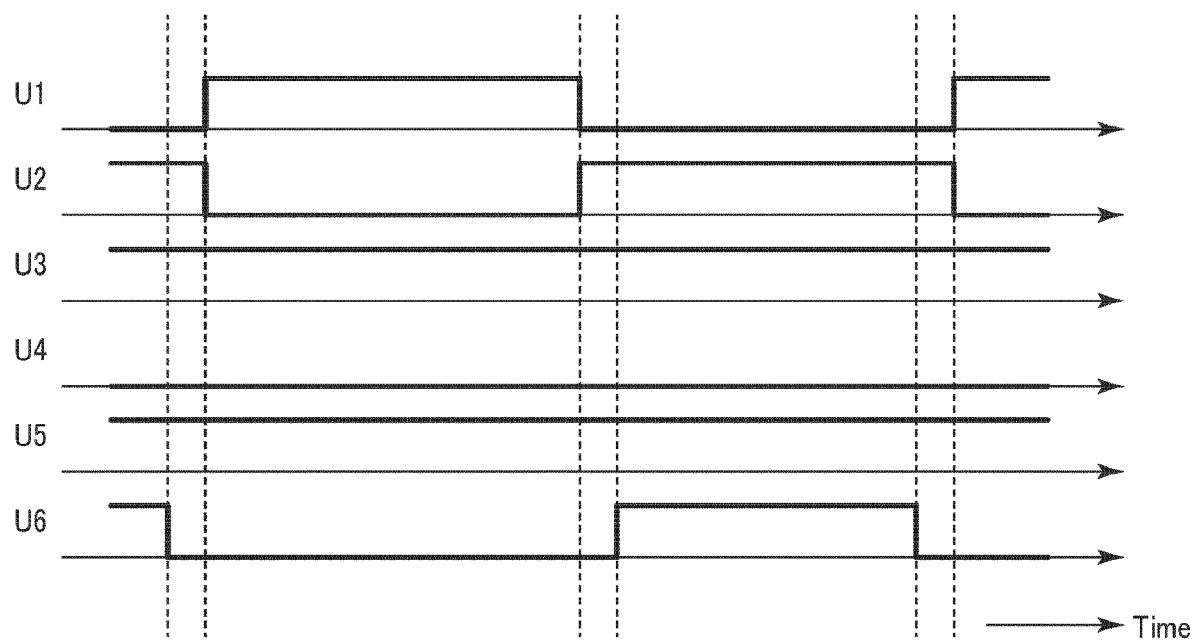
FIG. 8 is a timing chart for illustrating an example of the operation of the power conversion apparatus of the fifth embodiment.

FIG. 8 is a timing chart for illustrating an example of the operation of the power conversion apparatus of the fifth embodiment.

Herein, an example of switching timing of each of the first to sixth arms U1-U6 is shown; however, the actual required dead times are not shown. The switching elements of the same arm are sequentially turned on or off at time intervals; however, FIG. 8 shows switching timing of each arm, not switching timing of each switching element.

For example, the second arm U2 and the sixth arm U6 may be driven by approximately identical gate signals; however, the gate signal of the sixth arm U6 is adjusted so that the sixth arm U6 is turned on only while the second arm U2 is ON. For example, the third arm U3 and the fifth arm U5 may be driven by approximately identical gate signals; however, the gate signal of the fifth arm U5 is adjusted so that the fifth arm U5 is turned on only while the third arm U3 is ON.

This can reduce the switching losses of the fifth arm U5 and the sixth arm U6. As a result, the currents that flow through the third high potential side regenerative rectifier circuit and the third low potential side regenerative rectifier circuit can be decreased, the rated voltages of the regenerative rectifier diodes 6PCE, 6NCF can be lowered, and reduction in cost and size of the power conversion apparatus can be realized.

The same applies when the gate signals of the first arm U1 and the fourth arm U4 are switched, the gate signals of the second arm U2 and the third arm U3 are switched, and the gate signals of the sixth arm U6 and the fifth arm U5 are switched.

As described above, the power conversion apparatus of the present embodiment can attain advantages similar to those of the first embodiment. That is, the present embodiment can provide a power conversion apparatus and switch apparatus that can suppress the energy loss and avoid an increase in size.

Next, a power conversion apparatus of a sixth embodiment will be described in detail with reference to drawings.

Figure 9:
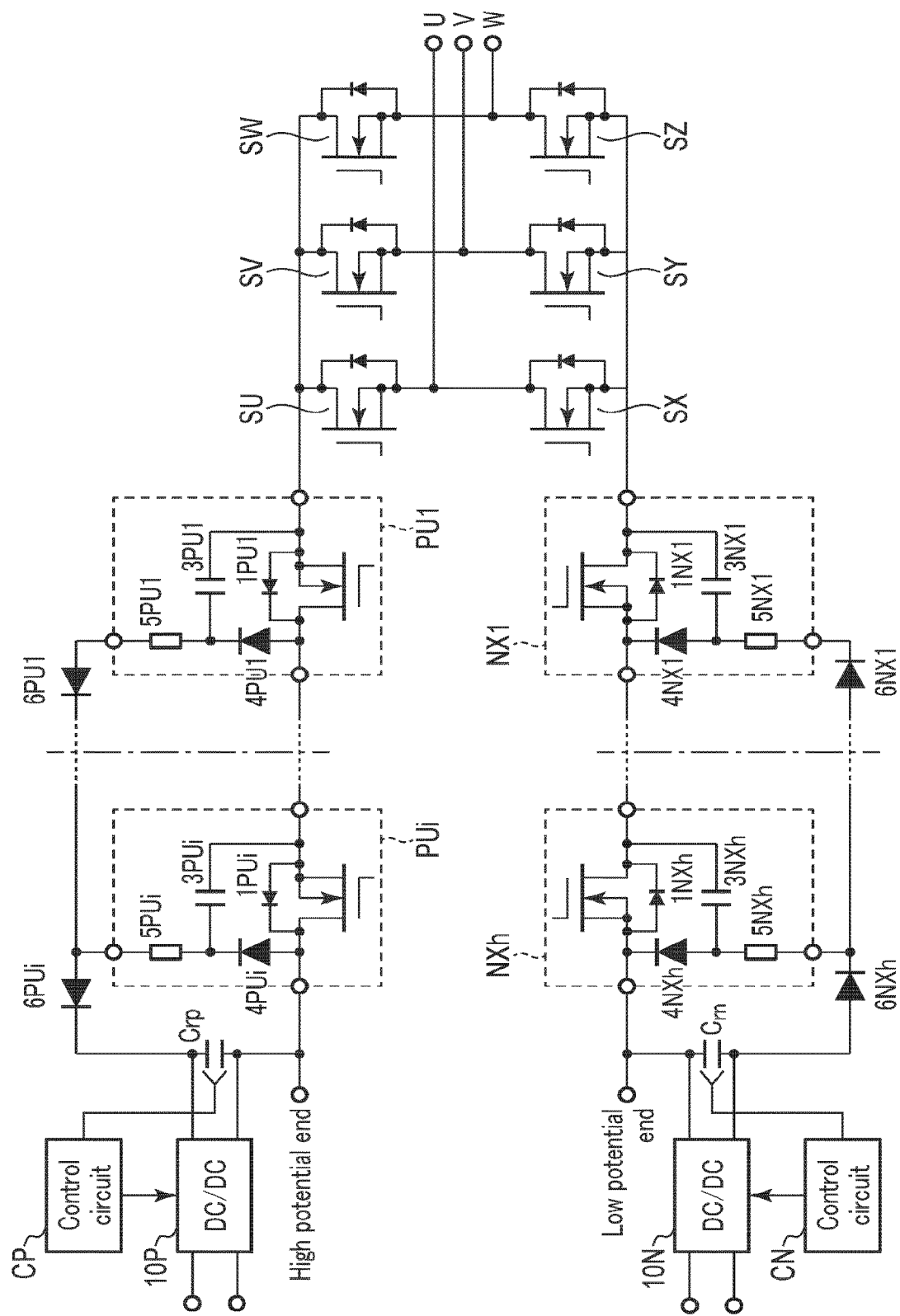
FIG. 9 is a schematic diagram showing a configuration example of a power conversion apparatus of a sixth embodiment.

FIG. 9 is a schematic diagram showing a configuration example of the power conversion apparatus of the sixth embodiment.

The power conversion apparatus of the present embodiment is configured by connecting a plurality of switch circuits in series to each of a high potential end and low potential end of a three-phase inverter circuit.

The power conversion apparatus of the present embodiment includes a three-phase inverter circuit, a P switch circuit, an N switch circuit, a P-side regenerative rectifier circuit, an N-side regenerative rectifier circuit, capacitor units Crp, Crn, DC/DC converters 10P, 10N, and control circuits CP, CN.

The three-phase inverter circuit includes a U-phase leg, a V-phase leg, and a W-phase leg. The U-phase leg includes an upper-arm switching element SU and a lower-arm switching element SX. The V-phase leg includes an upper-arm switching element SV and a lower-arm switching element SY. The W-phase leg includes an upper-arm switching element SW and a lower-arm switching element SZ.

The P switch circuit includes a plurality of switch circuits PUI (I=1 to i). The switch circuits PUI each have a configuration similar to that of the switch circuit 101N of the power conversion apparatus of the first embodiment. The switch circuits PUI are connected in series to each other on a path connecting the high potential end of the three-phase inverter circuit and a high potential end of the power conversion apparatus.

The P-side regenerative rectifier circuit includes a plurality of regenerative rectifier diodes 6PUI and a plurality of resistors 5PUI.

The regenerative rectifier diodes 6PUI are connected in series to each other between the other end of the capacitor unit Crp and the snubber terminal of the switch circuit PU1, with their forward directions directed from the low potential side to the high potential side. The anode of each of the regenerative rectifier diodes 6PUI is electrically connected to the snubber terminal of the switch circuit PUI and the cathode of the adjacent regenerative rectifier diode 6PUI on the low potential side. For example, the anode of the regenerative rectifier diode 6PU2 is electrically connected to the snubber terminal of the switch circuit PU2 and the cathode of the regenerative rectifier diode 6PUI. The anode of the regenerative rectifier diode 6PU1 is electrically connected to the snubber terminal of the switch circuit PU1. The cathode of the regenerative rectifier diode 6PUi is electrically connected to the other end of the capacitor unit Crp.

The resistor 5PUI is connected, at one end, to each of the diode 4PUI and the capacitor 3PUI in series. The other end of the resistor 5PUI is electrically connected, via the regenerative rectifier diode 6PUI, to a circuit in which the capacitor 3PUI and resistor 5PUI of the switch circuit PUI connected on the low potential side are connected in series. The other end of the resistor 5PUI of the switch circuit PUI (I=i) closest to the high potential end is electrically connected to the other end of the capacitor unit Crp via the regenerative rectifier diode 6PUI.

One end of the capacitor unit Crp is electrically connected to the high potential end of the power conversion apparatus. The other end of the capacitor unit Crp is electrically connected to the cathode of the regenerative rectifier diode 6PUi of the P-side regenerative rectifier circuit.

The N switch circuit includes a plurality of switch circuits NXH (H=1 to h). The switch circuits NXH each have a configuration similar to that of the switch circuit 102M of the power conversion apparatus of the first embodiment. The switch circuits NXH are connected in series to each other on a path connecting the low potential end of the three-phase inverter circuit to a low potential end of the power conversion apparatus.

The N-side regenerative rectifier circuit includes a plurality of regenerative rectifier diodes 6NXH and a plurality of resistors 5NXH.

The regenerative rectifier diodes 6NXH are connected in series to each other between the other end of the capacitor unit Crn and the snubber terminal of the switch circuit NX1, with their forward directions directed from the low potential side to the high potential side. The cathode of each of the regenerative rectifier diodes 6NXH is electrically connected to the snubber terminal of the switch circuit NXH and the anode of the adjacent regenerative rectifier diode 6NXH on the high potential side. For example, the cathode of the regenerative rectifier diode 6NX2 is electrically connected to the snubber terminal of the switch circuit NX2 and the anode of the regenerative rectifier diode 6NX1. The cathode of the regenerative rectifier diode 6NX1 is electrically connected to the snubber terminal of the switch circuit NX1. The anode of the regenerative rectifier diode 6NXh is electrically connected to the other end of the capacitor unit Crn.

The resistor 5NXH is connected, at one end, to each of the diode 4NXH and the capacitor 3NXH in series. The other end of the resistor 5NXH is electrically connected, via the regenerative rectifier diode 6NXH, to a circuit in which the capacitor 3NXH and resistor 5NXH of the switch circuit NXH connected on the low potential side are connected in series. The other end of the resistor 5NXH of the switch circuit NXH (H=h) closest to the low potential end is electrically connected to the other end of the capacitor unit Crn via the regenerative rectifier diode 6NXh.

One end of the capacitor unit Crn is electrically connected to the low potential end of the power conversion apparatus. The other end of the capacitor unit Crn is electrically connected to the anode of the regenerative rectifier diode 6NXh of the N-side regenerative rectifier circuit.

In the power conversion apparatus of the present embodiment, part of the energy generated by the switching operation of the P switch circuit is stored in the capacitor unit Crp, whereas part of the energy generated by the switching operation of the N switch circuit is stored in the capacitor unit Crn.

The DC/DC converter 10P converts energy stored in the capacitor unit Crp into a predetermined voltage to discharge the capacitor unit Crp. The DC/DC converter 10P may be connected to, for example, a control power supply, a DC power supply of the power conversion apparatus, or another circuit, which is not shown.

The control circuit CP can, for example, control the operation of the DC/DC converter 10P. The control circuit CP may perform control so that, for example, the voltage of the capacitor unit Crp takes a predetermined value.

The DC/DC converter 10N converts energy stored in the capacitor unit Crn into a predetermined voltage to discharge the capacitor unit Crn. The DC/DC converter 10N may be connected to, for example, a control power supply, a DC power supply of the power conversion apparatus, or another circuit, which is not shown.

The control circuit CN can, for example, control the operation of the DC/DC converter 10N. The control circuit CN may perform control so that, for example, the voltage of the capacitor unit Crn takes a predetermined value.

The configurations of the DC/DC converters 10P, 10N and control circuits CP, CN are similar to those of the power conversion apparatus of the first embodiment.

As described above, the power conversion apparatus of the present embodiment can highly efficiently regenerate part of the energy that is lost in a conventional power conversion apparatus, and can realize reduction in the energy loss.

FIG. 9 shows as an example a case where a P switch circuit and an N switch circuit are combined with a three-phase inverter circuit; however, the inverter circuit may be a single-phase inverter circuit or a multiphase inverter circuit. In any case, advantages similar to those in the case of the three-phase inverter circuit can be attained.

Next, an example of the operation of the power conversion apparatus of the present embodiment will be described.

A three-phase inverter circuit can output a 4-step common mode voltage. Where the DC voltage is VDC and the intermediate potential of the DC voltage VDC is at a virtual neutral point, the output voltage of each leg of the three-phase inverter circuit is +VDC/2 or −VDC/2. The common mode voltage is one third of the sum of the output voltages of the legs of the three-phase inverter circuit, and is a 4-step voltage, which is −VDC/2, −VDC/6, +VDC/6, or +VDC/2 depending on the output states of the legs. In the case where the 4-step voltage is +VDC/2 or −VDC/2, the output voltages of the legs are all +VDC/2 or −VDC/2. In this case, the output voltages of the respective phases of the three-phase inverter circuit cancel each other out, and are all zeroed.

In contrast, the power conversion apparatus of the present embodiment includes a P switch circuit connected between the high potential end of the three-phase inverter circuit and the high potential end of the power conversion apparatus, and an N switch circuit connected between the low potential end of the three-phase inverter circuit and the high potential end of the power conversion apparatus. This configuration can zero all output voltages of the power conversion apparatus by turning off both of the P switch circuit and the N switch circuit. Specifically, when the output voltages of the power conversion apparatus are all zeroed, the P switch circuit and the N switch circuit are both turned off, and the DC power supply and the three-phase inverter circuit are thereby electrically disconnected from each other; accordingly, the DC voltage applied to the three-phase inverter circuit becomes zero. This can zero the common mode voltage of the three-phase inverter circuit.

Use of this circuit operation enables the power conversion apparatus of the present embodiment to output a 3-step common mode voltage, which is −VDC/6, 0, and +VDC/6, and makes the variation of the 3-step common mode voltage VDC/3; therefore, the common mode voltage of the three-phase inverter circuit can be reduced to one third.

In, for example, conventional two-phase modulation, when the output voltages are all zeroed, the variation of the common mode voltage can be made 2 VDC/3 by a method of making all of the output voltages of the legs only +VDC/2 or −VDC/2. The power conversion apparatus of the present embodiment can make the common mode voltage half in comparison with the case where two-phase modulation is performed.

Figure 10:
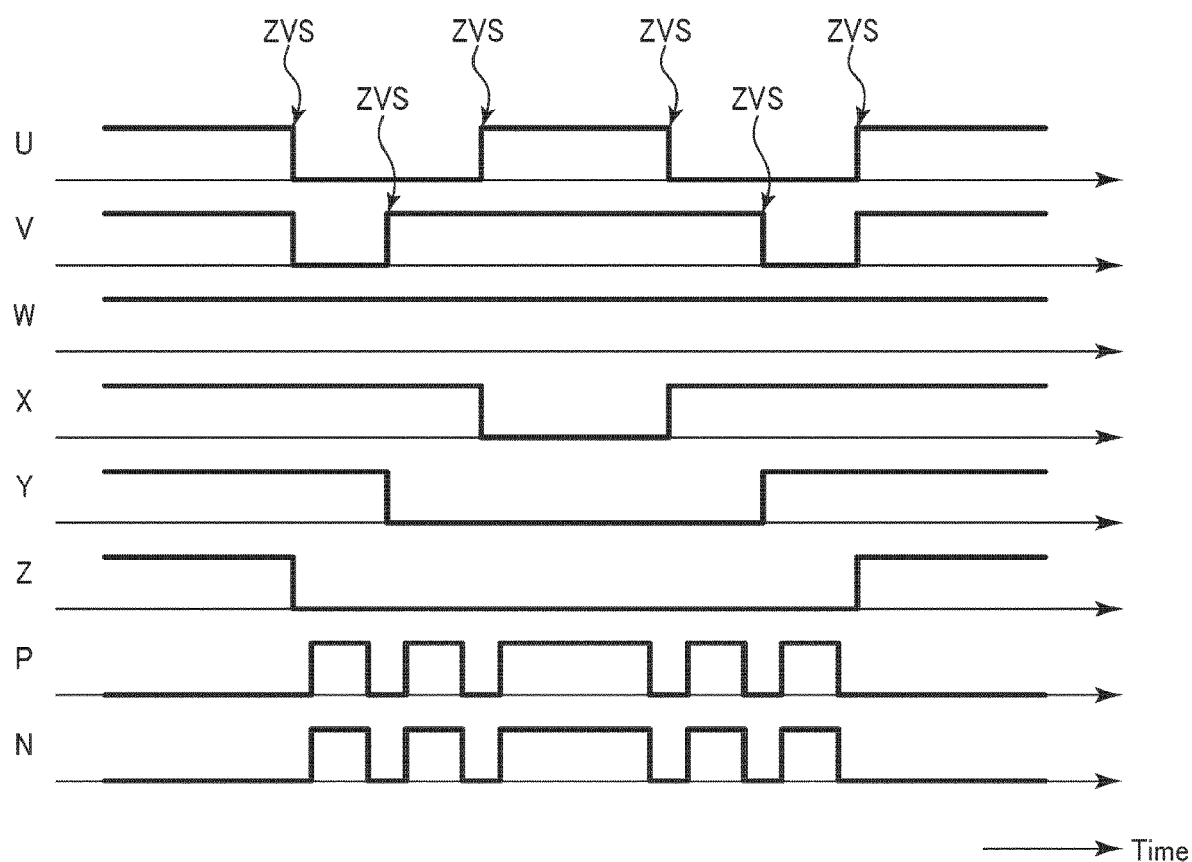
FIG. 10 is a timing chart for illustrating an example of the operation of the power conversion apparatus of the sixth embodiment.

FIG. 10 is a timing chart for illustrating an example of the operation of the power conversion apparatus of the sixth embodiment.

Shown here is an example of switching timing of each of the switching elements of the three-phase inverter circuit, the P switch circuit, and the N switch circuit. The actual required dead times are not shown. FIG. 10 also shows timing of performing zero voltage switching (ZVS).

Signals U, V, W, X, Y, Z are examples of gate signals of the switching elements SU, SV, SW, SX, SY, SZ of the three-phase inverter circuit, respectively. Signals P, N are examples of gate signals of the P switch circuit and the N switch circuit, respectively. The switching elements of each of the P switch circuit and the N switch circuit are sequentially turned on or off at time intervals; however, FIG. 10 does not show switching timing of each switching element, but shows switching timing of the entire switch circuit (such as when switching of all switching elements included in the switch circuit has been completed).

In the power conversion apparatus of the present embodiment, when all output voltages of the power conversion apparatus are zeroed, all switching elements of the three-phase inverter circuit are turned on after the P switch circuit and the N switch circuit are turned off, whereby a current passes through the switching elements of both an upper arm and a lower arm of the three-phase inverter circuit, and a loss and heat can be dispersed. This realizes reduction in size of the three-phase inverter circuit.

Figure 11:
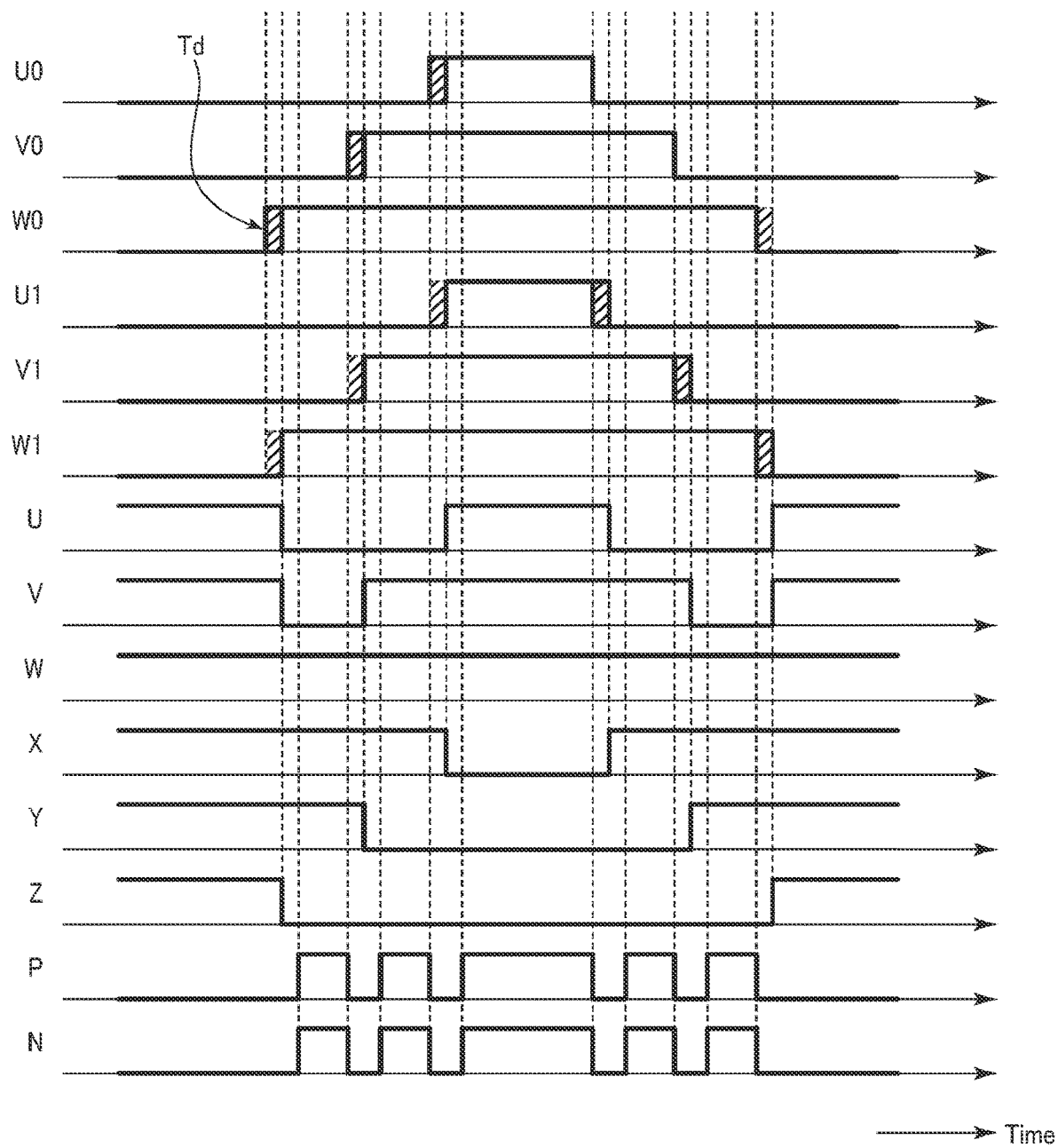
FIG. 11 is a diagram for explaining the timing chart shown in FIG. 10.

FIG. 11 is a diagram for explaining the timing chart shown in FIG. 10.

Signals U0, V0, W0 are signals from which the gate signals of the switching elements SU-SZ of the three-phase inverter circuit are generated. Signals X0, Y0, Z0 (not shown) are signals obtained by inverting signals U0, V0, W0.

The P switch circuit and the N switch circuit are turned on only when the switching element SU and the switching element SX are not simultaneously ON, the switching element SV and the switching element SY are not simultaneously ON, and the switching element SW and the switching element SZ are not simultaneously ON. When signals U0, V0, W0 change, the P switch circuit and the N switch circuit are turned off for a certain period of time. The period of time during which the P switch circuit and the N switch circuit are turned off will be referred to as a DC voltage zero time.

Specifically, the P switch circuit and the N switch circuit are turned off regardless of the DC voltage zero time when signals U0, V0, W0 or signals X0, Y0, Z0 are simultaneously ON, are turned off for the DC voltage zero time when signals U0, V0, W0 or signals X0, Y0, Z0 change, and are turned on at the other times.

Signals U1, V1, W1 are generated from signals U0, V0, W0 by allowing for a delay time Td. The delay time Td is shorter than the DC voltage zero time during which the P switch circuit and the N switch circuit are turned off.

All switching elements SU to SZ are simultaneously turned on when the P switch circuit and the N switch circuit are turned off in the state where signals U1, V1, W1 or inversion signals X1, Y1, Z1 (not shown) are simultaneously ON.

Since a pulse is not output for a period during which the P switch circuit and the N switch circuit are OFF, compensation therefor is required. The amount of compensation is a duty cycle corresponding to five times as long as the DC voltage zero time for the pulse with the longest duty cycle, and a duty cycle corresponding to three times for the pulse with the second longest duty cycle, and twice for the pulse with the shortest duty cycle.

As described above, in the power conversion apparatus of the present embodiment, when all output voltages are zeroed, the P switch circuit and the N switch circuit are turned off, and all switching elements SU-SZ of the three-phase inverter circuit are turned on. In addition, when a current flows from the DC side to the AC side of the three-phase inverter circuit (for example, at the time of powering a vehicle), by turning off the P switch circuit and the N switch circuit at the switching timing of the switching elements SU-SZ of the three-phase inverter circuit, the DC voltage of the three-phase inverter circuit can be zeroed, and zero voltage switching can be performed in all of the switching elements. SU-SZ. Accordingly, the switching loss of the three-phase inverter circuit can be significantly reduced.

In addition, for example when the regenerative rectifier circuit that regenerates energy from the P switch circuit and N switch circuit to the capacitor units Crp, Crn is not provided, the parasitic inductance that is parasitic on the switching group increases, and the switching loss thereby increases. In contrast, in the power conversion apparatus of the present embodiment, since energy of the parasitic inductance can be regenerated by the regenerative rectifier circuit to the capacitor unit Crp, Crn and stored therein, the switching loss of the P switch circuit and the N switch circuit can be reduced, and highly efficient switching can be realized.

As described above, the power conversion apparatus of the present embodiment can attain advantages similar to those of the first embodiment. That is, the present embodiment can provide a power conversion apparatus and switch apparatus that can suppress the energy loss and avoid an increase in size.

Next, a switch apparatus of a seventh embodiment will be described in detail with reference to drawings.

Figure 12:
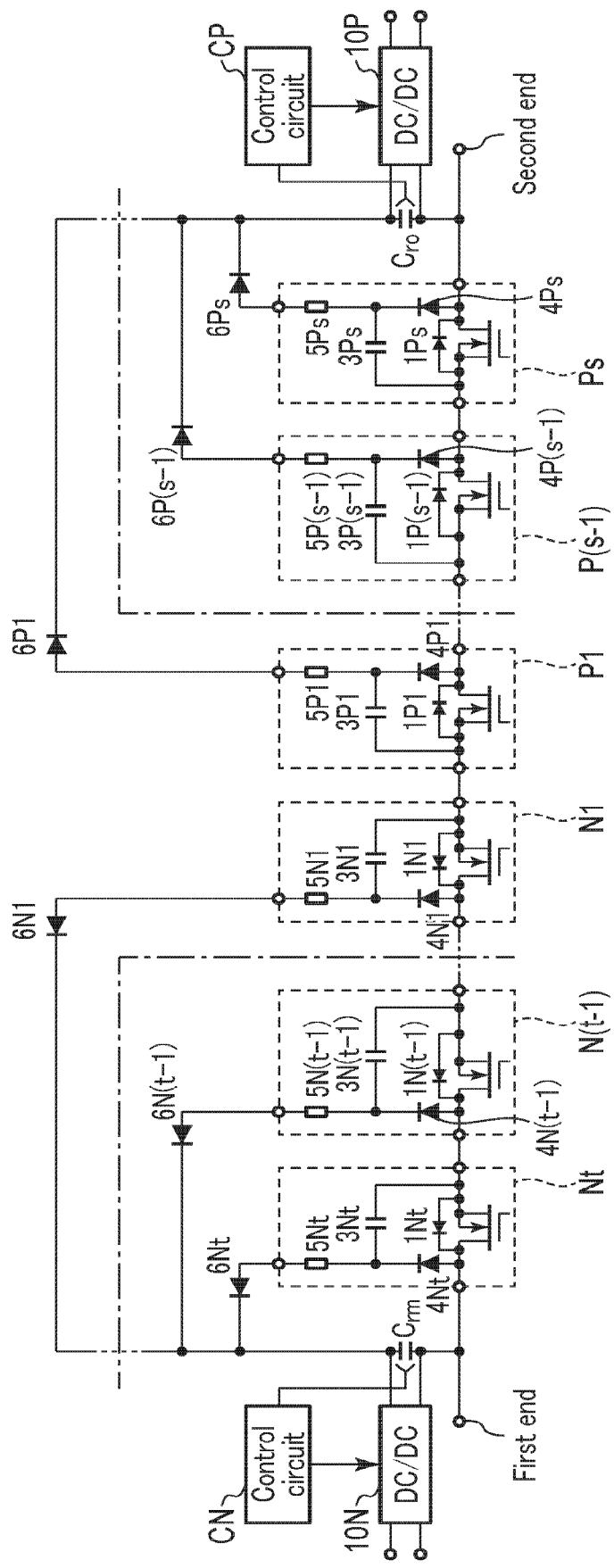
FIG. 12 is a schematic diagram showing a configuration example of a switch apparatus of a seventh embodiment.

FIG. 12 is a schematic diagram showing a configuration example of the switch apparatus of the seventh embodiment.

The switch circuit of the present embodiment is a bidirectional switch circuit including two switch circuits connected in antiseries.

The switch apparatus of the present embodiment includes a plurality of switch circuits NT (T=1 to t), a plurality of switch circuits PS (S=1 to s), a regenerative rectifier circuit, capacitor units Cro, Crm, DC/DC converters 10P, 10N, and control circuits CP, CN.

The switch circuits NT and the switch circuits PS are connected in antiseries to each other between a first end and second end of the switch apparatus.

The switch circuits NT and the switch circuits PS each have a configuration similar to that of the switch circuit 101N of the power conversion apparatus of the first embodiment.

The switch circuits NT each include a switching element 1NT, a capacitor 3NT, and a diode 4NT. The switching element 1NT is, for example, a MOSFET.

The switch circuits NT are connected in series to each other with the drain of the switching element 1NT on the first end side and the source thereof on the second end side. The switching element 1NT of the switch circuit NT (T=t) closest to the first end is electrically connected, at its drain, to the first end and one end of the capacitor unit Crm. The switching element 1NT of the switch circuit NT (T=1) closest to the second end is electrically connected, at its source, to the source of the switching element 1PS of the switch circuit PS (S=1).

The switch circuits PS each include a switching element 1PS, a capacitor 3PS, and a diode 4PS. The switching element 1PS is, for example, a MOSFET.

The switch circuits PS are connected in series to each other with the drain of the switching element 1PS on the second end side and the source thereof on the first end side. The switching element 1PS of the switch circuit PS (S=s) closest to the second end is electrically connected, at its drain, to the second end and one end of the capacitor unit Cro. The switching element 1PS of the switch circuit PS (S=1) closest to the first end is electrically connected, at its source, to the source of the switching element 1NT of the switch circuit NT (T=1).

The regenerative rectifier circuit includes a plurality of regenerative rectifier diodes 6NT, 6PS and a plurality of resistors 5NT, 5PS.

The t regenerative rectifier diodes 6NT are each connected between the snubber terminal of the switch circuit NT and the other end of the capacitor unit Crm on the first end side, with their forward directions directed from the second end side to the first end side. In other words, the snubber terminal of the switch circuit NT is electrically connected to the anode of the regenerative rectifier diode 6NT. The other end of the capacitor unit Crm is electrically connected to the cathodes of the regenerative rectifier diodes 6NT.

The resistor 5NT is connected, at one end, to a node between the diode 4NT and the capacitor 3NT (part of a structure electrically connecting the low potential end of the capacitor 3NT to the cathode of the diode 4NT) in series. The other end of the resistor 5NT is electrically connected to the anode of the regenerative rectifier diode 6NT via the snubber terminal.

The s regenerative rectifier diodes 6PS are each connected between the snubber terminal of the switch circuit PS and the other end of the capacitor unit Cro on the second end side, with their forward directions directed from the first end side to the second end side. In other words, the snubber terminal of the switch circuit PS is electrically connected to the anode of the regenerative rectifier diode 6PS. The other end of the capacitor unit Cro is electrically connected to the cathodes of the regenerative rectifier diodes 6PS.

The resistor 5PS is connected, at one end, to a node between the diode 4PS and the capacitor 3PS (part of a structure electrically connecting the high potential end of the capacitor 3PS to the cathode of the diode 4PS) in series. The other end of the resistor 5PS is electrically connected to the anode of the regenerative rectifier diode GPS via the snubber terminal.

The capacitor unit Crm has one end electrically connected to the first end of the switch apparatus, and another end electrically connected to the cathodes of the t regenerative rectifier diodes 6NT.

The capacitor unit Cro has one end electrically connected to the second end of the switch apparatus, and another end electrically connected to the cathodes of the s regenerative rectifier diodes 6PS.

The DC/DC converter 10P converts energy stored in the capacitor unit Cro into a predetermined voltage to discharge the capacitor unit Cro. The DC/DC converter 10P may be connected to, for example, a control power supply, a DC power supply of the power conversion apparatus, or another circuit, which is not shown.

The control circuit CP can, for example, control the operation of the DC/DC converter 10P. The control circuit CP may perform control so that, for example, the voltage of the capacitor unit Cro takes a predetermined value.

The DC/DC converter 10N converts energy stored in the capacitor unit Crm into a predetermined voltage to discharge the capacitor unit Crm. The DC/DC converter 10N may be connected to, for example, a control power supply, a DC power supply of the power conversion apparatus, or another circuit, which is not shown.

The control circuit CN can, for example, control the operation of the DC/DC converter 10N. The control circuit CN may perform control so that, for example, the voltage of the capacitor unit Crm takes a predetermined value.

The configurations of the DC/DC converters 10P, 10N and control circuits CP, CN are similar to those of the power conversion apparatus of the first embodiment.

With the above-described configuration, part of the energy generated by switching of the switching elements 1NT is stored in the capacitor unit Crm, whereas part of the energy generated by switching of the switching elements 1PS is stored in the capacitor unit Cro. The energy stored in the capacitor unit Crm, Cro can be regenerated by the DC/DC converter 10N, 10P for a DC power supply or a control power supply.

As described above, the power conversion apparatus of the present embodiment can highly efficiently regenerate part of the energy that is lost in a conventional power conversion apparatus, and can realize reduction in the energy loss.

The switch apparatus of the present embodiment can attain advantages similar to those of the first embodiment. Accordingly, the present embodiment can provide a power conversion apparatus and switch apparatus that can suppress the energy loss and avoid an increase in size.

In the above-described embodiment, the switch circuits NT and the switch circuits PS each have a configuration similar to that of the switch circuit 101N of the power conversion apparatus of the first embodiment; however, they may have a configuration similar to that of the switch circuit 102M. That is, the switch apparatus in the example shown in FIG. 12 is configured to allow a current to flow from the drain side (high potential side) of the switching element to the regenerative rectifier diode; however, it may be configured to allow a current to flow from the regenerative rectifier diode to the source side (low potential side) of the switching element. Even in this case, advantages similar to those of the above-described embodiment can be attained by connecting the switch circuits NT in antiseries to the switch circuits PS and storing part of the energy generated by switching in the capacitor units Cro, Crm provided respectively on the first end side and second end side.

Next, a switch apparatus of an eighth embodiment will be described in detail with reference to a drawing.

FIG. 13 is a schematic diagram showing a configuration example of the switch apparatus of the eighth embodiment.

The switch apparatus of the present embodiment is a bidirectional switch circuit including two switch circuits connected in antiseries, similar to that of the seventh embodiment, but differs therefrom in that a capacitor unit is arranged between the two switch circuits.

In the description of the present embodiment, the same components as those of the switch apparatus of the seventh embodiment will be assigned the same reference numerals.

The switch apparatus of the present embodiment includes a plurality of switch circuits NT (T=1 to t), a plurality of switch circuits PS (S=1 to s), a regenerative rectifier circuit, a capacitor unit Crm, a DC/DC converter 10, and a control circuit C.

The switch circuits NT and the switch circuits PS are connected in antiseries to each other between a first end and second end of the switch apparatus. In the present embodiment, the switch circuits NT are arranged on the second end side, and the switch circuits PS are arranged on the first end side.

The switch circuits NT and the switch circuits PS each have a configuration similar to that of the switch circuit 101N of the power conversion apparatus of the first embodiment.

The switch circuits NT each include a switching element 1NT, a capacitor 3NT, and a diode 4NT. The switching element 1NT is, for example, a MOSFET.

The switch circuits NT are connected in series to each other with the drain of the switching element 1NT on the first end side and the source thereof on the second end side. The switching element 1NT of the switch circuit NT (T=t) closest to the first end is electrically connected, at its drain, to the drain of the switching element 1PS of the switch circuit PS (S=s) and one end of the capacitor unit Crm. The switching element 1NT of the switch circuit NT (T=1) closest to the second end is electrically connected, at its source, to the second end.

The switch circuits PS each include a switching element 1PS, a capacitor 3PS, and a diode 4PS. The switching element 1PS is, for example, a MOSFET.

The switch circuits PS are connected in series to each other with the drain of the switching element 1PS on the second end side and the source thereof on the first end side. The switching element 1PS of the switch circuit PS (S=s) closest to the second end is electrically connected, at its drain, to the drain of the switching element 1NT of the switch circuit NT (T=t) and one end of the capacitor unit Crm. The switching element 1PS of the switch circuit PS (S=1) closest to the first end is electrically connected, at its source, to the first end.

The regenerative rectifier circuit includes a plurality of regenerative rectifier diodes 6NT, GPS and a plurality of resistors 5NT, 5PS.

The t regenerative rectifier diodes 6NT are each connected between the snubber terminal of the switch circuit NT and the other end of the capacitor unit Crm, with their forward directions directed from the second end side to the first end side. In other words, the snubber terminal of the switch circuit NT is electrically connected to the anode of the regenerative rectifier diode 6NT. The other end of the capacitor unit Crm is electrically connected to the cathodes of the regenerative rectifier diodes 6NT.

The resistor 5NT is connected, at one end, to a node between the diode 4NT and the capacitor 3NT (part of a structure electrically connecting the low potential end of the capacitor 3NT to the cathode of the diode 4NT) in series. The other end of the resistor 5NT is electrically connected to the anode of the regenerative rectifier diode 6NT via the snubber terminal.

The s regenerative rectifier diodes 6PS are each connected between the snubber terminal of the switch circuit PS and the other end of the capacitor unit Crm, with their forward directions directed from the first end side to the second end side. In other words, the snubber terminal of the switch circuit PS is electrically connected to the anode of the regenerative rectifier diode 6PS. The other end of the capacitor unit Crm is electrically connected to the cathodes of the regenerative rectifier diodes 6PS.

The resistor 5PS is connected, at one end, to a node between the diode 4PS and the capacitor 3PS (part of a structure electrically connecting the high potential end of the capacitor 3PS to the cathode of the diode 4PS) in series. The other end of the resistor 5PS is electrically connected to the anode of the regenerative rectifier diode 6PS via the snubber terminal.

The capacitor unit Crm has one end electrically connected to the drain of the switching element 1N1 and the drain of the switching element 1Ps, and another end electrically connected to the cathodes of the t regenerative rectifier diodes 6NT and the cathodes of the s regenerative rectifier diodes 6PS.

The DC/DC converter 10 converts energy stored in the capacitor unit Crm into a predetermined voltage to discharge the capacitor unit Crm. The DC/DC converter 10 may be connected to, for example, a control power supply, a DC power supply of the power conversion apparatus, or another circuit, which is not shown.

The control circuit C can, for example, control the operation of the DC/DC converter 10. The control circuit C may perform control so that, for example, the voltage of the capacitor unit Crm takes a predetermined value.

The configurations of the DC/DC converter 10 and control circuit C are similar to those of the power conversion apparatus of the first embodiment.

With the above-described configuration, part of the energy generated by switching of the switching elements 1NT and the switching elements 1PS is stored in the capacitor unit Crm. The energy stored in the capacitor unit Crm can be regenerated by the DC/DC converter 10 for a DC power supply or a control power supply.

As described above, the power conversion apparatus of the present embodiment can highly efficiently regenerate part of the energy that is lost in a conventional power conversion apparatus, and can realize reduction in the energy loss.

The switch apparatus of the present embodiment can attain advantages similar to those of the first embodiment. Accordingly, the present embodiment can provide a power conversion apparatus and switch apparatus that can suppress the energy loss and avoid an increase in size.

In the above-described embodiment, the switch circuits NT and the switch circuits PS each have a configuration similar to that of the switch circuit 101N of the power conversion apparatus of the first embodiment; however, they may have a configuration similar to that of the switch circuit 102M. That is, the switch apparatus in the example shown in FIG. 13 is configured to allow a current to flow from the drain side (high potential side) of the switching element to the regenerative rectifier diode; however, it may be configured to allow a current to flow from the regenerative rectifier diode to the source side (low potential side) of the switching element. Even in this case, advantages similar to those of the above-described embodiment can be attained by connecting the switch circuits NT in antiseries to the switch circuits PS and storing part of the energy generated by switching in the capacitor unit Crm provided between the switch circuits NT and the switch circuits PS.

Next, a power conversion apparatus of a ninth embodiment will be described in detail with reference to a drawing.

Figure 14:
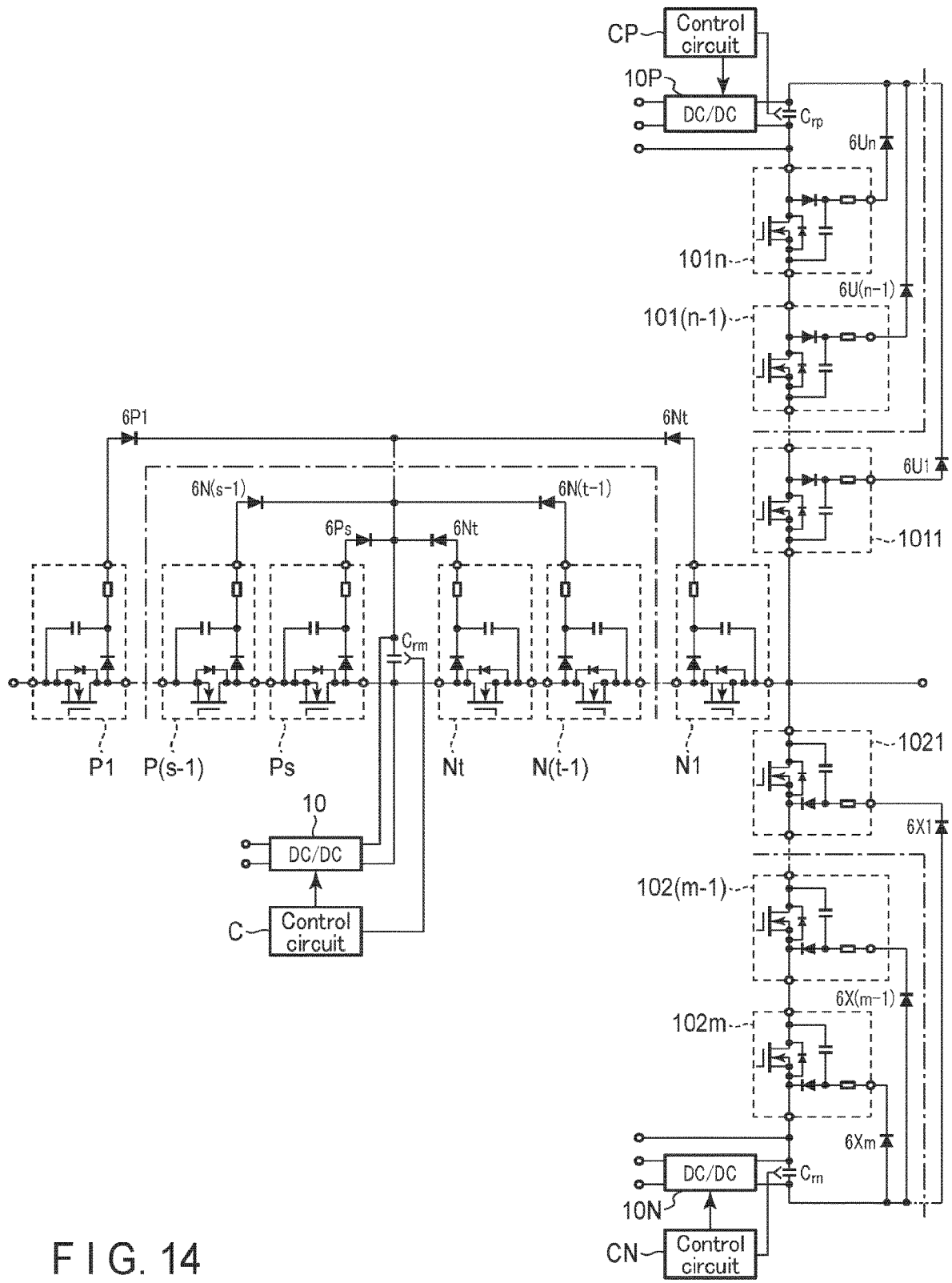
FIG. 14 is a schematic diagram showing a configuration example of a power conversion apparatus of a ninth embodiment.

FIG. 14 is a schematic diagram showing a configuration example of the power conversion apparatus of the ninth embodiment.

The power conversion apparatus of the present embodiment is a T-type NPC power conversion apparatus in which one leg of the power conversion apparatus of the first embodiment is combined with the switch apparatus of the eighth embodiment. That is, the power conversion apparatus of the present embodiment is configured by connecting the second end of the switch apparatus of the eighth embodiment to the neutral point between the upper arm and lower arm of one leg.

Therefore, the power conversion apparatus of the present embodiment can attain advantages similar to those of the first embodiment and the eighth embodiment. Accordingly, the present embodiment can provide a power conversion apparatus and switch apparatus that can suppress the energy loss and avoid an increase in size.

In addition, the T-type NPC power conversion apparatus can minimize the number of capacitor units Crp, Crn, Crm and the number of DC/DC converters 10, 10P, 10N by adopting the switch apparatus of the eighth embodiment as a bidirectional switch. In the case where a T-type NPC power conversion apparatus has three phases, a capacitor unit on the high potential side and a capacitor unit on the low potential side which are shared by the three-phase legs are provided, and a capacitor unit is provided for each of the switch circuits connected to the respective three-phase legs; accordingly, the power conversion apparatus only needs five DC/DC converters in total.

Next, a power conversion apparatus of a tenth embodiment will be described in detail with reference to drawings.

The power conversion apparatus of the present embodiment is, for example, an AC/AC converter (matrix converter) using nine switch apparatuses of the seventh embodiment.

FIGS. 15 and 16 are schematic diagrams showing configuration example of the power conversion apparatus of the tenth embodiment.

The power conversion apparatus shown in FIG. 15 is, for example, a power conversion apparatus configured to convert, for example, three-phase AC powers of an R phase, S phase, and T phase into three-phase AC powers of a U phase, C phase, and W phase, and includes nine switch circuits 200, capacitor units Cr, Cs, Ct, Cu, Cv, Cw, DC/DC converters 10R, 10S, 10T, 10U, 10V, 10W, and control circuits $C_{RST}$, $C_{UVW}$.

The nine switch circuits 200 include a switch circuit that switches a connection between an R-phase terminal and a U-phase terminal, a switch circuit that switches a connection between the R-phase terminal and a V-phase terminal, a switch circuit that switches a connection between the R-phase terminal and a W-phase terminal, a switch circuit that switches a connection between an S-phase terminal and the U-phase terminal, a switch circuit that switches a connection between the S-phase terminal and the V-phase terminal, a switch circuit that switches a connection between the S-phase terminal and the W-phase terminal, a switch circuit that switches a connection between a T-phase terminal and the U-phase terminal, a switch circuit that switches a connection between the T-phase terminal and the V-phase terminal, and a switch circuit that switches a connection between the T-phase terminal and the W-phase terminal.

The switch circuits 200 each have the same configuration as the switch apparatus of the seventh embodiment except that the capacitor units Cro, Crm, DC/DC converters 10P, 10N, and control circuits CP, CN are absent, as shown in FIG. 16.

The capacitor unit Cr is a capacitor unit shared by and provided on the first end side of the switch circuit that switches the connection between the R-phase terminal and the U-phase terminal, the switch circuit that switches the connection between the R-phase terminal and the V-phase terminal, and the switch circuit that switches the connection between the R-phase terminal and the W-phase terminal.

The capacitor unit Cs is a capacitor unit shared by and provided on the first end side of the switch circuit that switches the connection between the S-phase terminal and the U-phase terminal, the switch circuit that switches the connection between the S-phase terminal and the V-phase terminal, and the switch circuit that switches the connection between the S-phase terminal and the W-phase terminal.

The capacitor unit Ct is a capacitor unit shared by and provided on the first end side of the switch circuit that switches the connection between the T-phase terminal and the U-phase terminal, the switch circuit that switches the connection between the T-phase terminal and the V-phase terminal, and the switch circuit that switches the connection between the T-phase terminal and the W-phase terminal.

The capacitor unit Cu is a capacitor unit shared by and provided on the second end side of the switch circuit that switches the connection between the R-phase terminal and the U-phase terminal, the switch circuit that switches the connection between the S-phase terminal and the U-phase terminal, and the switch circuit that switches the connection between the T-phase terminal and the U-phase terminal.

The capacitor unit Cv is a capacitor unit shared by and provided on the second end side of the switch circuit that switches the connection between the R-phase terminal and the V-phase terminal, the switch circuit that switches the connection between the S-phase terminal and the V-phase terminal, and the switch circuit that switches the connection between the T-phase terminal and the V-phase terminal.

The capacitor unit Cw is a capacitor unit shared by and provided on the second end side of the switch circuit that switches the connection between the R-phase terminal and the W-phase terminal, the switch circuit that switches the connection between the S-phase terminal and the W-phase terminal, and the switch circuit that switches the connection between the T-phase terminal and the W-phase terminal.

The DC/DC converter 10R converts energy stored in the capacitor unit Cr into a predetermined voltage to discharge the capacitor unit Cr. The DC/DC converter 10S converts energy stored in the capacitor unit Cs into a predetermined voltage to discharge the capacitor unit Cs. The DC/DC converter 10T converts energy stored in the capacitor unit Ct into a predetermined voltage to discharge the capacitor unit Ct. The DC/DC converters 10R, 10S, 10T may be connected to, for example, a control power supply, a DC power supply of the power conversion apparatus, or another circuit, which is not shown.

The control circuit $C_{RST}$ can, for example, control the operations of the DC/DC converters 10R, 10S, 10T. The control circuit $C_{RST}$ may perform control so that, for example, the voltages of the capacitor units Cr, Cs, Ct each take a predetermined value.

The DC/DC converter 10U converts energy stored in the capacitor unit Cu into a predetermined voltage to discharge the capacitor unit Cu. The DC/DC converter 10V converts energy stored in the capacitor unit Cv into a predetermined voltage to discharge the capacitor unit Cv.

The DC/DC converter 10W converts energy stored in the capacitor unit Cw into a predetermined voltage to discharge the capacitor unit Cw. The DC/DC converters 10U, 10V, 10W may be connected to, for example, a control power supply, a DC power supply of the power conversion apparatus, or another circuit, which is not shown.

The control circuit $C_{UVW}$ can, for example, control the operations of the DC/DC converters 10U, 10V, 10W. The control circuit $C_{UVW}$ may perform control so that, for example, the voltages of the capacitor units Cu, Cv, Cw each take a predetermined value.

The power conversion apparatus of the present embodiment can attain advantages similar to those of the seventh embodiment. Accordingly, the present embodiment can provide a power conversion apparatus and switch apparatus that can suppress the energy loss and avoid an increase in size.

The matrix converter can minimize the number of DC/DC converters by adopting the configuration of the switch apparatus of the seventh embodiment. In a matrix converter using the switch apparatus of the eighth embodiment for example, the capacitor unit Crm cannot be shared by a plurality of switch circuits 200, and nine DC/DC converters, which are the same in number as the switch circuits 200, need to be provided. In contrast, in the matrix converter shown in FIG. 15, six DC/DC converters corresponding to the capacitor units of the respective R, S, T, U, V, W phases are sufficient, and the power conversion apparatus can be prevented from increasing in size.

According to the embodiments described above, power conversion apparatuses and switch apparatuses of (C1)-(C11) are provided.

(C1) A power conversion apparatus comprising:

an upper arm and lower arm electrically connected between a high potential end and a low potential end;

a first capacitor unit electrically connected at one end to the high potential end;

a second capacitor unit electrically connected at one end to the low potential end;

a first regenerative rectifier circuit electrically connected to another end of the first capacitor unit;

a second regenerative rectifier circuit electrically connected to another end of the second capacitor unit;

a first conversion circuit configured to cause energy stored in the first capacitor unit to be discharged; and a second conversion circuit configured to cause energy stored in the second capacitor unit to be discharged, wherein the upper arm comprises a first switch circuit or a series of first switch circuits, the first switch circuit comprising a first switching element, a first diode with an anode electrically connected to a high potential end of the first switching element, and a first capacitor electrically connected between a cathode of the first diode and a low potential end of the first switching element, the lower arm comprises a second switch circuit or a series of second switch circuits, the second switch circuit comprising a second switching element, a second diode with a cathode electrically connected to a low potential end of the second switching element, and a second capacitor electrically connected between an anode of the second diode and a high potential end of the second switching element, the first regenerative rectifier circuit connects a high potential end of the first capacitor of the upper arm to the other end of the first capacitor unit with a forward direction directed from a low potential side to a high potential side, and the second regenerative rectifier circuit connects a low potential end of the second capacitor of the lower arm to the other end of the second capacitor unit, with a forward direction directed from the low potential side to the high potential side.

(C2) A power conversion apparatus comprising:
an upper arm and lower arm electrically connected between a high potential end and a low potential end;
a capacitor unit electrically connected at one end to the high potential end;
a regenerative rectifier circuit electrically connected to another end of the capacitor unit; and
a conversion circuit configured to cause energy stored in the capacitor unit to be discharged, wherein
the upper arm and the lower arm each comprise a switch circuit or a series of switch circuits, the switch circuit comprising a switching element, a diode with an anode electrically connected to a high potential end of the switching element, and a capacitor electrically connected between a cathode of the diode and a low potential end of the switching element, and
the regenerative rectifier diode connects high potential ends of the capacitors of the upper arm and lower arm to the other end of the capacitor unit with a forward direction directed from a low potential side to a high potential side.

(C3) A power conversion apparatus comprising:
an upper arm and lower arm electrically connected between a high potential end and a low potential end;
a capacitor unit electrically connected at one end to the low potential end;
a regenerative rectifier circuit electrically connected to another end of the capacitor unit; and
a conversion circuit configured to cause energy stored in the capacitor unit to be discharged, wherein
the upper arm and the lower arm each comprise a switch circuit or a series of switch circuits, the switch circuit comprising a switching element, a diode with a cathode electrically connected to a low potential end of the switching element, and a capacitor electrically connected between an anode of the diode and a high potential end of the switching element, and
the regenerative rectifier diode connects low potential ends of the capacitors of the upper arm and lower arm to the other end of the capacitor unit with a forward direction directed from a low potential side to a high potential side.

(C4) A power conversion apparatus comprising:
an upper arm and lower arm electrically connected between a high potential end and a low potential end;
a reactor electrically connected to a node between the upper arm and the lower arm;
a capacitor unit electrically connected at one end to the low potential end;
a regenerative rectifier circuit electrically connected to another end of the capacitor unit; and a conversion circuit configured to cause energy stored in the capacitor unit to be discharged, wherein
the upper arm comprises a third diode with a forward direction directed from the low potential end to the high potential end,
the lower arm comprises a switch circuit or a series of switch circuits, the switch circuit comprising a switching element, a diode with a cathode electrically connected to a low potential end of the switching element, and a capacitor electrically connected between an anode of the diode and a high potential end of the switching element, and
the regenerative rectifier diode connects a low potential end of the capacitor of the lower arm to the other end of the capacitor unit with a forward direction directed from a low potential side to a high potential side.

(C5) A power conversion apparatus comprising:
an upper arm and lower arm electrically connected between a high potential end and a low potential end;
a reactor electrically connected to a node between the upper arm and the lower arm;
a capacitor unit electrically connected at one end to the high potential end;
a regenerative rectifier circuit electrically connected to another end of the capacitor unit; and
a conversion circuit configured to cause energy stored in the capacitor unit to be discharged, wherein
the upper arm comprises a switch circuit or a series of switch circuits, the switch circuit comprising a switching element, a diode with an anode electrically connected to a high potential end of the switching element, and a capacitor electrically connected between a cathode of the diode and a low potential end of the switching element,
the lower arm comprises a fourth diode with a forward direction directed from the low potential end to the high potential end, and
the regenerative rectifier diode connects a high potential end of the capacitor of the upper arm to the other end of the capacitor unit with a forward direction directed from a low potential side to a high potential side.

(C6) A power conversion apparatus comprising:
a first arm and second arm electrically connected between a high potential end and an intermediate potential end;
a third arm and fourth arm electrically connected between the intermediate potential end and a low potential end;
a fifth arm electrically connected between an output potential end and a node between the first arm and the second arm;
a sixth arm electrically connected between the output potential end and a node between the third arm and the fourth arm;
a first capacitor unit electrically connected at one end to the high potential end;
a second capacitor unit electrically connected at one end to the low potential end;
a high potential side regenerative rectifier circuit configured to regenerate at least part of the energy generated by switching of the first arm, the second arm and the sixth arm to the first capacitor unit;
a low potential side regenerative rectifier circuit configured to regenerate at least part of the energy generated by switching of the third arm, the fourth arm, and the fifth arm to the second capacitor unit; and
a conversion circuit configured to cause energy stored in the first capacitor unit and the second capacitor unit to be discharged, wherein
the first arm, the second arm, and the sixth arm each comprise a first switch circuit or a series of first switch circuits, the first switch circuit comprising a first switching element, a first diode with an anode electrically connected to a high potential end of the first switching element, and a first capacitor electrically connected between a cathode of the first diode and a low potential end of the first switching element, the third arm, the fourth arm, and the fifth arm each comprise a second switch circuit or a series of second switch circuits, the second switch circuit comprising a second switching element, a second diode with a cathode electrically connected to a low potential end of the second switching element, and a second capacitor electrically connected between an anode of the second diode and a high potential end of the second switching element, the high potential side regenerative rectifier diode connects a high potential end of the first capacitor to the other end of the first capacitor unit with a forward direction directed from a low potential side to a high potential side, and the low potential side regenerative rectifier diode connects a low potential end of the second capacitor to the other end of the second capacitor unit, with a forward direction directed from the low potential side to the high potential side.

(C7) A power conversion apparatus comprising:
an inverter circuit;
a P switch circuit electrically connected between a high potential side DC end and a high potential end of the inverter circuit;
an N switch circuit electrically connected between a low potential side DC end and a low potential end of the inverter circuit;
a first capacitor unit electrically connected at one end to the high potential end;
a second capacitor unit electrically connected at one end to the low potential end;
a first regenerative rectifier circuit electrically connected to another end of the first capacitor unit;
a second regenerative rectifier circuit electrically connected to another end of the second capacitor unit;
a first conversion circuit configured to cause energy stored in the first capacitor unit to be discharged; and
a second conversion circuit configured to cause energy stored in the second capacitor unit to be discharged, wherein
the P switch circuit comprises a first switch circuit or a series of first switch circuits, the first switch circuit comprising a first switching element, a first diode with an anode electrically connected to a high potential side end of the first switching element, and a first capacitor electrically connected between a cathode of the first diode and a DC end side end of the first switching element,
the N switch circuit comprises a second switch circuit or a series of second switch circuits, the second switch circuit comprising a second switching element, a second diode with a cathode electrically connected to a low potential side end of the second switching element, and a second capacitor electrically connected between an anode of the second diode and a DC end side end of the second switching element,
the first regenerative rectifier circuit connects a high potential side end of the first capacitor to the other end of the first capacitor unit, with a forward direction directed from the high potential side DC end to the high potential end, and
the second regenerative rectifier circuit connects a low potential side end of the second capacitor to the other end of the second capacitor unit, with a forward direction directed from the low potential side DC end to the low potential end.

(C8) A switch apparatus comprising:
two switch circuits electrically connected in antiseries to each other between a first end and a second end;
a first capacitor unit electrically connected at one end to the first end;
a second capacitor unit electrically connected at one end to the second end;
a first regenerative rectifier circuit electrically connected to another end of the first capacitor unit;
a second regenerative rectifier circuit electrically connected to another end of the second capacitor unit;
a first conversion circuit configured to cause energy stored in the first capacitor unit to be discharged; and
a second conversion circuit configured to cause energy stored in the second capacitor unit to be discharged, wherein
one of the switch circuits comprises a first switch circuit or a series of first switch circuits, the first switch circuit comprising a first switching element, a first diode with an anode electrically connected to a first end side end of the first switching element, and a first capacitor electrically connected between a cathode of the first diode and a second end side end of the first switching element,
another one of the switch circuits comprises a second switch circuit or a series of second switch circuits, the second switch circuit comprising a second switching element, a second diode with an anode electrically connected to a second end side end of the second switching element, and a second capacitor electrically connected between a cathode of the second diode and a first end side end of the second switching element,
the first regenerative rectifier diode connects a first end side end of the first capacitor to the other end of the first capacitor unit, with a forward direction directed from the second end to the first end, and
the second regenerative rectifier diode connects a second end side end of the second capacitor to the other end of the second capacitor unit, with a forward direction directed from the first end to the second end.

(C9) A switch apparatus comprising:
two switch circuits electrically connected in antiseries to each other between a first end and a second end;
a capacitor unit electrically connected at one end to a node between the two switch circuits;
a regenerative rectifier circuit electrically connected to another end of the capacitor unit; and
a conversion circuit configured to cause energy stored in the capacitor unit to be discharged, wherein
one of the switch circuits comprises a first switch circuit or a series of first switch circuits, the first switch circuit comprising a first switching element, a first diode with an anode electrically connected to a first end side end of the first switching element, and a first capacitor electrically connected between a cathode of the first diode and a second end side end of the first switching element,
another one of the switch circuits comprises a second switch circuit or a series of second switch circuits, the second switch circuit comprising a second switching element, a second diode with an anode electrically connected to a second end side end of the second switching element, and a second capacitor electrically connected between a cathode of the second diode and a first end side end of the second switching element,
the regenerative rectifier diode connects a first end side end of the first capacitor to the other end of the capacitor unit, with a forward direction directed from the second end to the first end, and connects a second end side end of the second capacitor to the other end of the capacitor unit, with a forward direction directed from the first end to the second end.

(C10) A power conversion apparatus comprising:
a power conversion apparatus according to (C1); and
a switch apparatus according to (C8), wherein
the switch apparatus is electrically connected at the second end to a node between the upper arm and lower arm of the power conversion apparatus.

(C11). A power conversion apparatus configured to convert a three-phase AC power into a three-phase AC power, the power conversion apparatus comprising:
nine switch apparatuses according to (C7) electrically connected between one three-phase AC terminal and another three-phase AC terminal, wherein
the first capacitor unit is shared by three of the switch apparatuses electrically connected in common to the one AC terminal, and
the second capacitor unit is shared by three of the switch apparatuses electrically connected in common to the other AC terminal.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A power conversion apparatus comprising:
an upper arm including a plurality of first switch circuits connected in series with each other, and a lower arm including a plurality of second switch circuits connected in series with each other, the upper arm and the lower arm being placed between a high potential end and a low potential end;
a first capacitor unit electrically connected at one end to the high potential end;
a second capacitor unit electrically connected at one end to the low potential end;
a plurality of first regenerative rectifier circuits electrically connected to another end of the first capacitor unit;
a plurality of second regenerative rectifier circuits electrically connected to another end of the second capacitor unit;
a first conversion circuit configured to cause energy stored in the first capacitor unit to be discharged; and
a second conversion circuit configured to cause energy stored in the second capacitor unit to be discharged, wherein
each of the first switch circuits comprises a first switching element, a first diode with an anode electrically connected to a high potential end of the first switching element, and a first capacitor electrically connected between a cathode of the first diode and a low potential end of the first switching element,
each of the second switch circuits comprises a second switching element, a second diode with a cathode electrically connected to a low potential end of the second switching element, and a second capacitor electrically connected between an anode of the second diode and a high potential end of the second switching element,
each of the first regenerative rectifier circuits connects a high potential end of the first capacitor of one of the plurality of first switch circuits of the upper arm to the other end of the first capacitor unit, with a forward direction directed from a low potential side to a high potential side, and
each of the second regenerative rectifier circuits connects a low potential end of the second capacitor of one of the plurality of second switch circuits of the lower arm to the other end of the second capacitor unit, with a forward direction directed from the low potential side to the high potential side.

2. A power conversion apparatus of claim 1 comprising:
an inverter circuit electrically connected between the upper arm and the lower arm.

3. A power conversion apparatus of claim 1 further comprising:
a switch apparatus comprising:
two switch circuits electrically connected in antiseries to each other between a first end and a second end;
a first capacitor unit electrically connected at one end to the first end;
a second capacitor unit electrically connected at one end to the second end;
a first regenerative rectifier circuit electrically connected to another end of the first capacitor unit;
a second regenerative rectifier circuit electrically connected to another end of the second capacitor unit;
a first conversion circuit configured to cause energy stored in the first capacitor unit to be discharged; and
a second conversion circuit configured to cause energy stored in the second capacitor unit to be discharged, wherein
one of the switch circuits comprises a first switch circuit or a series of first switch circuits, the first switch circuit comprising a first switching element, a first diode with an anode electrically connected to a first end side end of the first switching element, and a first capacitor electrically connected between a cathode of the first diode and a second end side end of the first switching element,
another one of the switch circuits comprises a second switch circuit or a series of second switch circuits, the second switch circuit comprising a second switching element, a second diode with an anode electrically connected to a second end side end of the second switching element, and a second capacitor electrically connected between a cathode of the second diode and a first end side end of the second switching element,
the first regenerative rectifier diode connects a first end side end of the first capacitor to the other end of the first capacitor unit, with a forward direction directed from the second end to the first end, and
the second regenerative rectifier diode connects a second end side end of the second capacitor to the other end of the second capacitor unit, with a forward direction directed from the first end to the second end, wherein
the switch apparatus is electrically connected at the second end to a node between the upper arm and lower arm of the power conversion apparatus.

4. A power conversion apparatus of claim 1, wherein the plurality of first switching elements of the first switch circuits and the plurality of second switching elements of the second switch circuits are controlled to be sequentially turned on and turned off at predetermined intervals.

5. A power conversion apparatus of claim 1, wherein each of the first regenerative rectifier circuits includes a first register, and each of the second regenerative rectifier circuits includes a second register.

6. A power conversion apparatus of claim 5, wherein each of the first regenerative rectifier circuits further includes a first rectifier diode with its anode connected to the first register, and each of the second regenerative rectifier circuits further includes a second rectifier diode with its cathode connected to the second register.

7. A power conversion apparatus comprising:
   an upper arm including a plurality of switch circuits connected in series with each other, and a lower arm including a plurality of switch circuits connected in series with each other, the upper arm and the lower arm being placed between a high potential end and a low potential end;
   a capacitor unit electrically connected at one end to the high potential end;
   a plurality of regenerative rectifier circuits electrically connected to another end of the capacitor unit; and
   a conversion circuit configured to cause energy stored in the capacitor unit to be discharged, wherein
   each of the switch circuits comprises a switching element, a diode with an anode electrically connected to a high potential end of the switching element, and a capacitor electrically connected between a cathode of the diode and a low potential end of the switching element, and
   each of the regenerative rectifier circuits connects a high potential end of the capacitor of one of the plurality of switch circuits of the upper arm and the lower arm to the other end of the capacitor unit, with a forward direction directed from a low potential side to a high potential side.

8. A power conversion apparatus comprising:
   an upper arm including a plurality of switch circuits connected in series with each other, and a lower arm including a plurality of switch circuits connected in series with each other, the upper arm and the lower arm being placed between a high potential end and a low potential end;
   a capacitor unit electrically connected at one end to the low potential end;
   a plurality of regenerative rectifier circuits electrically connected to another end of the capacitor unit; and
   a conversion circuit configured to cause energy stored in the capacitor unit to be discharged, wherein
   each of the switch circuits comprises a switching element, a diode with a cathode electrically connected to a low potential end of the switching element, and a capacitor electrically connected between an anode of the diode and a high potential end of the switching element, and
   each of the regenerative rectifier circuits connects low potential end of the capacitor of one of the plurality of switch circuits of the upper arm and the lower arm to the other end of the capacitor unit, with a forward direction directed from a low potential side to a high potential side.

* * * * *